(12) United States Patent
Sanchez et al.

(10) Patent No.: US 8,216,487 B2
(45) Date of Patent: Jul. 10, 2012

(54) COPOLYMER OF PROPYLENE OR ETHYLENE OXIDE AND OF AN OXIRANE BEARING AN IONIC GROUP

(75) Inventors: Jean-Yves Sanchez, Saint-Ismier (FR); Marc Deschamps, Quimper (FR); Fannie Alloin, Vézille (FR); Christophe Chauvin, Vaulx Milieu (FR); Cristina Iojoiu, Grenoble (FR)

(73) Assignee: Batscap, Ergue-Gaberic (FR)

( * ) Notice: Subject to any disclaimer, the term of this patent is extended or adjusted under 35 U.S.C. 154(b) by 24 days.

(21) Appl. No.: 11/884,476

(22) PCT Filed: Feb. 9, 2006

(86) PCT No.: PCT/FR2006/000295
§ 371 (c)(1),
(2), (4) Date: Jul. 16, 2008

(87) PCT Pub. No.: WO2006/087449
PCT Pub. Date: Aug. 24, 2006

(65) Prior Publication Data
US 2009/0176161 A1 Jul. 9, 2009

(30) Foreign Application Priority Data
Feb. 16, 2005 (FR) .................................. 05 01582

(51) Int. Cl.
*H01G 9/02* (2006.01)
(52) U.S. Cl. ....... 252/62.2; 429/314; 429/317; 429/492; 525/403; 525/523; 525/535; 528/391; 528/419; 528/421
(58) Field of Classification Search .................. 528/419, 528/391, 421; 252/62.2; 429/314, 317, 492; 525/403, 523, 535
See application file for complete search history.

(56) References Cited

U.S. PATENT DOCUMENTS

| 3,243,455 A | | 3/1966 | Pizzini et al. |
| 3,706,706 A | | 12/1972 | Vandenberg |
| 5,965,753 A | * | 10/1999 | Masaki et al. ................ 549/513 |
| 6,335,123 B1 | * | 1/2002 | Lascaud et al. .............. 429/306 |

FOREIGN PATENT DOCUMENTS
EP 0 657 484 6/1995

OTHER PUBLICATIONS

Dworak, A.; Baran, G.; Trzebicka, B.; Walach, W.; Reactive & Functional Polymers, 1999, vol. 42, p. 31-36.*
Xiaohui, Y.; Xiaoying, S.; Jianjun, C.; Yunhang, L.; Xinling, W.; Journal of Applied Polymer Science, 2003, vol. 90, p. 1185-1190.*
Ito, K.; Nishina, N.; Ohno, H.; J. Mater. Chem., 1997, 7(8), p. 1357-1362.*
Kohjiya, S.; Horiuchi, T.; Miura, K.; Kitagawa, M.; Sakashita, T.; Matoba, Y.; Ikeda, Y.; Polymer International, 2000, 49, p. 197-202.*
Kaluzynski, K.; Pretula, J.; Lapienis, G.; Basko, M.; Bartczak, Z.; Dworak, A.; Penczek, S.; Journal of Polymer Science: Part A: Polymer Chemistry, 2001, 39, p. 955-963.*
International Search Report mailed Jun. 19, 2006.

* cited by examiner

*Primary Examiner* — David W Wu
*Assistant Examiner* — Robert Jones, Jr.
(74) *Attorney, Agent, or Firm* — Merchant & Gould

(57) ABSTRACT

The invention relates to a copolymer of ethylene oxide or propylene oxide and at least one substituted oxirane bearing an ionic group.

The copolymer is characterized in that its chain comprises repeat units $-O-CH_2-CH(-CH_2-O-SO_3^-Li^+)-$, repeat units $-O-CH_2-CHR-$ in which R is H or $CH_3$, optionally, repeat units $-O-CH_2-CH(-CH_2R')-$ in which R' is a functional group. x Uses: electrolyte in electrochemical, selective-membrane and reference-membrane devices.

28 Claims, 6 Drawing Sheets

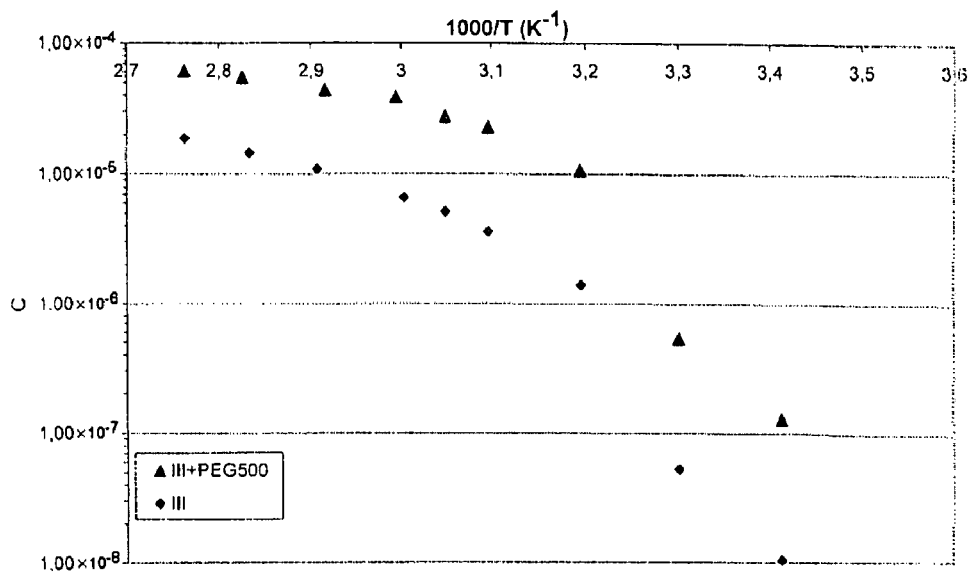
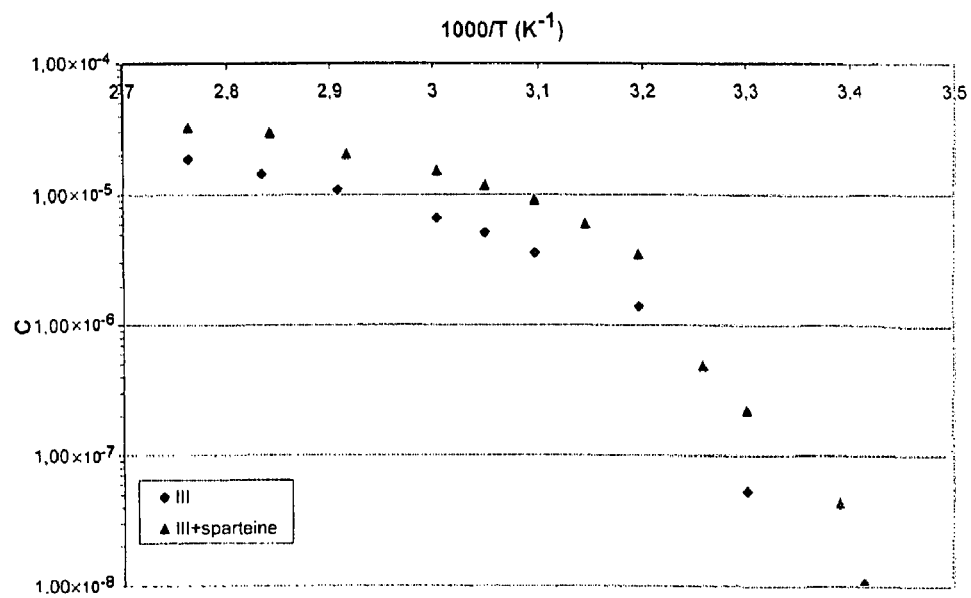

COPOLYMER OF PROPYLENE OR ETHYLENE OXIDE AND OF AN OXIRANE BEARING AN IONIC GROUP

The present invention relates to a copolymer of ethylene oxide or propylene oxide with at least one substituted oxirane bearing an ionic group, to a method of preparing it and to various uses.

BACKGROUND OF THE INVENTION

It is known to use solvating polymers for the production of ionically conducting materials. Ethylene oxide or dioxolane polymers are solvating polymers with respect to cations, in particular alkaline metal cations such as for example the $Li^+$ ion present in rechargeable electrochemical generators of the polymer-electrolyte lithium battery type. The semicrystalline character of the polymers has the consequence of reducing the conductivity of the materials that contain them. The crystallinity of the semicrystalline polymers has been reduced by introducing irregularities into the macromolecular chain, without affecting the solvating properties and the electrochemical stability of the copolymer thus obtained. However, it has been found that introducing irregularities into the polyether chain was frequently accompanied by a reduction in the molar masses relative to the ethylene oxide homopolymer and in the mechanical properties, especially at high temperature. It has been sought to remedy this drawback by introducing into the polymer units that allow the formation of three-dimensional networks by crosslinking the copolymer, after it has been formed. Introducing such units into a copolymer has also allowed various groups, and especially ionic groups, to be attached to the macromolecular chain. For example, EP 0 603 370 discloses copolymers comprising repeat units coming from an oxirane and from a dioxolane and optionally bearing groups allowing crosslinking with a third monomer, the example of a third monomer cited comprising a fluorinated segment between a polymerizable group and an ionic group; the crosslinked material then comprises ionic groups connected to a main chain via fluorinated segments. EP 0 657 484 discloses a copolymer comprising a lateral substituent of the alkyl(perfluoroalkyl)sulfonate ether type, for example —$CH_2$—O—$(CF_2)_p$—$SO_3Li$. EP 0 671 386 discloses perfluorinated disulfonate monomers and polymers obtained from these monomers, in which the chain-end groups are sulfonates. In both cases, the electrolytes containing said polymers have a cationic transport number $t^+$ substantially equal to 1. However, the incorporation of the fluorinated unit involves synthesis of a very expensive monomer, which is not entirely consumed during the polymerization. This is because the perfluorosulfonate-type ionic functional group is attached to the main polyether chain. Such polymers may be obtained:
 by preparation of an oxirane bearing a perfluorosulfonate anion and copolymerization of said oxirane with ethylene oxide or propylene oxide;
 by preparation of a compound having at least one C═C double bond, in which one of the carbon atoms bears a perfluorosulfonate anionic group, and by incorporation of said compound by crosslinking to a polyether bearing C═C double bonds.

SUMMARY OF THE INVENTION

The object of the present invention is to propose a novel copolymer having good mechanical strength, which comprises repeat units of the oxyalkylene type, among which some bear ionic groups and, optionally, some bear various functional groups, said copolymer exhibiting performance characteristics at least similar to the copolymers of the prior art, but able to be prepared from less expensive and less toxic monomers than those of the prior art, owing to the absence of perfluorinated monomers.

One subject of the present invention is consequently a copolymer. Another subject of the invention is a method of preparing said copolymer. Other subjects consist of a crosslinked material obtained from the copolymer, an ionically conducting material containing said copolymer, and various electrochemical devices in which the electrolyte and/or an electrode contain said copolymer.

BRIEF DESCRIPTION OF THE DRAWINGS

FIG. 8 shows the ionic conduction results of copolymer III taken in isolation and a material consisting of a mixture of copolymer III and polyethylene glycol dimethyl ether of 500 molar mass (PEG500), in which the PEG 500 represented 10% by mass.

The curve depicted by the triangles relates to the copolymer III/PEG 500 mixture and the curve depicted by the diamonds relates to copolymer III.

FIG. 9 shows the ionic conduction results of a material consisting of copolymer III used without a complexing agent and a mixture of copolymer III and sparteine, in which sparteine represented 29% by mass (1/1 molar ratio between the number of lithium sulfate functional groups and number of sparteine molecules). The curve depicted by the triangles relates to the copolymer III/sparteine mixture and the curve depicted by the diamonds relates to copolymer III.

Figure 10:
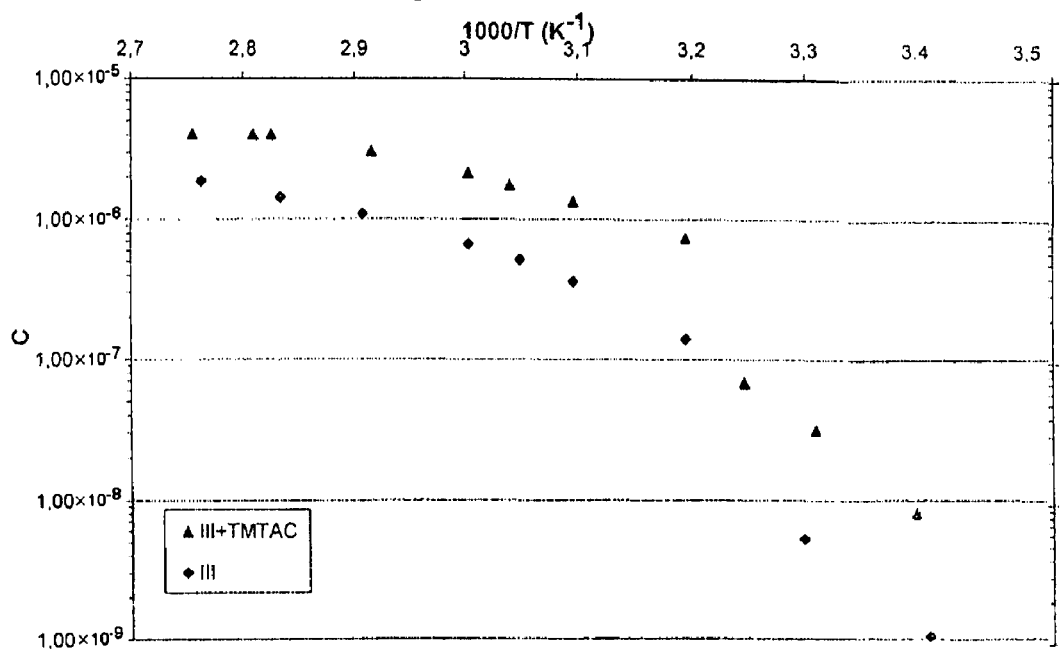

FIG. 10 shows the ionic conduction results of copolymer III taken in isolation and material consisting of a mixture of copolymer III and tetraazacyclotetradecane (TMTAC), in which TMTAC represented 31.5% by mass (1/1 molar ratio between the number of lithium sulfate functional groups and TMTAC).

The curve depicted by the triangles relates to the copolymer III/TMTAC mixture and the curve depicted by the diamonds relates to copolymer III.

Figure 11:
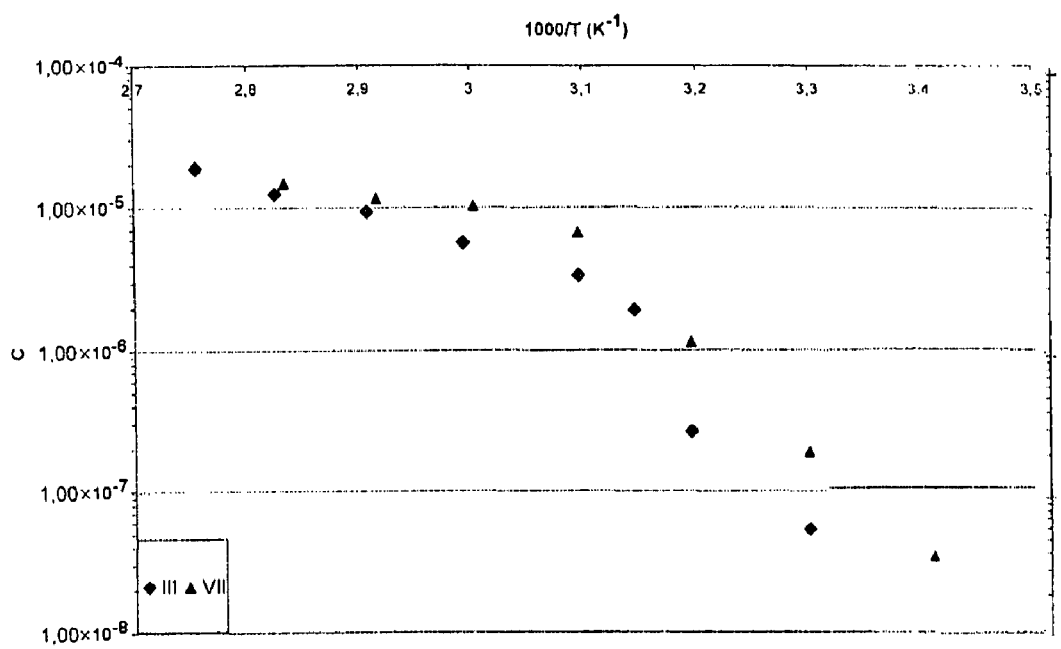

FIG. 11 shows the ionic conduction results of copolymer III taken in isolation and copolymer of formula VII of Example 3. The curve depicted by the triangles relates to the copolymer VII and the curve depicted by the diamonds relates to copolymer III.

DETAILED DESCRIPTION OF THE PREFERRED EMBODIMENTS

A copolymer according to the present invention is characterized in that its chain comprises:
 repeat units —O—$CH_2$—CHR— in which R is H or $CH_3$;
 repeat units —O—$CH_2$—CH(—$CH_2$—O—$SO_3^-Li^+$)—;
 and optionally, repeat units —O—CH$_2$—CH(—CH$_2$R')— in which R' is a functional group.

In the rest of the text, the —O—CH$_2$—CHR—, —O—CH$_2$—CH(—CH$_2$—O—SO$_3^-$Li$^+$) and —O—CH$_2$—CH(—CH$_2$R')— repeat units will be denoted by U(R), U(Li) and U(R') respectively. Their molar proportion in a given copolymer is denoted by N(R), N(Li) and N(R') respectively. Preferably, 70≦N(R)≦95, 2.5≦N(Li)≦15 and 0≦N(R')≦20.

A copolymer according to the invention may be a copolymer in which the various repeat units are distributed randomly. A copolymer according to the invention may furthermore be a block copolymer that comprises one or more segments consisting of U(R) units, one or more segments consisting of U(Li) units and optionally one or more segments consisting of U(R') units.

In one embodiment, all the substituents R' of a given copolymer represent the same functional group. In another embodiment, the substituents R' represent different functional groups.

The functional groups R' may be chosen from groups allowing the copolymer to be crosslinked, or from polar groups. As examples of functional groups allowing the copolymer to be crosslinked, mention may be made of OH; the epoxy group; the allyl ether group CH$_2$=CH—CH$_2$—O—; the methallyl ether group CH$_2$=C(CH$_3$)—CH$_2$—O—; groups of the vinyl ether R$^1$CH=CR$^2$—O— or R$^1$CH=CR$^2$—O—CH$_2$—CH$_2$—O— type in which R$^1$ and R$^2$ represent, independently of each other, H, an alkyl, an alkenyl or an aryl group; the acrylate group CH$_2$=CH—C(O)—O—; the methacrylate group CH$_2$=C(CH$_3$)—C(O)—O—; the styrenyl group CH$_2$=CH(Ph)-CH$_2$—; the vinyl benzoate group CH$_2$=CH(Ph)C(O)—O—; the cinnamate group (Ph)-CH=CH—C(O)—O—; and an —O—CO—NH—R$^3$—Si(OR$^4$)$_3$ group in which R$^4$ is an alkyl radical having 1 to 3 carbon atoms and R$^3$ is an alkylene group, for example —(CH$_2$)$_3$—. As examples of polar groups, mention may be made of —CN, —OH, cyclic carbonate groups, sulfolane, sulfoxide, sulfone and sulfonamide.

In the present text, and unless expressly indicated to the contrary: "alkyl group" means a linear or branched alkyl group preferably having 1 to 10 carbon atoms; "alkenyl group" means a linear or branched hydrocarbon group having at least one double bond >C=C< and preferably having 2 to 10 carbon atoms; "aryl group" means a group comprising at least one hydrocarbon aromatic ring, optionally bearing one or more substituents; and Ph represents a phenyl group.

A copolymer according to the invention comprising U(R') repeat units, in which R' is an R'$^1$ group allowing crosslinking, may be subjected to crosslinking in order to obtain a crosslinked material exhibiting ionic conduction. Another subject of the invention is consequently a crosslinked material consisting of main chains consisting of —O—CH$_2$—CHR— repeat units in which R is H or CH$_3$, —O—CH$_2$—CH(—CH$_2$—O—SO$_3^-$M$^+$)- repeat units in which M represents an alkali metal, optionally —O—CH$_2$—CH(R')— repeat units in which R' is an R'$^2$ polar group and —O—CH$_2$—CH(—X—)— repeat units in which —X— is a chain link between the main chains. A main chain as defined above is denoted hereinafter by CP chain. The chain link depends on the nature of the group R'$^1$ and on the method of crosslinking.

A copolymer according to the invention may be crosslinked by condensation when R'$^1$ is OH. For example, two OH groups of two repeat units form a urethane bridge —CO—NH-̄-NH—CO— by reaction with a diisocyanate O=C=N$^-$-N=C=O, it being possible for the diisocyanate to be an alkylene diisocyanate, 2,4-toluene diisocyanate, 2,6-toluene diisocyanate, an α,ω-oligooxyalkylene diisocyanate (for example a PEG diisocyanate) or a PTHF diisocyanate.

Figure 1:
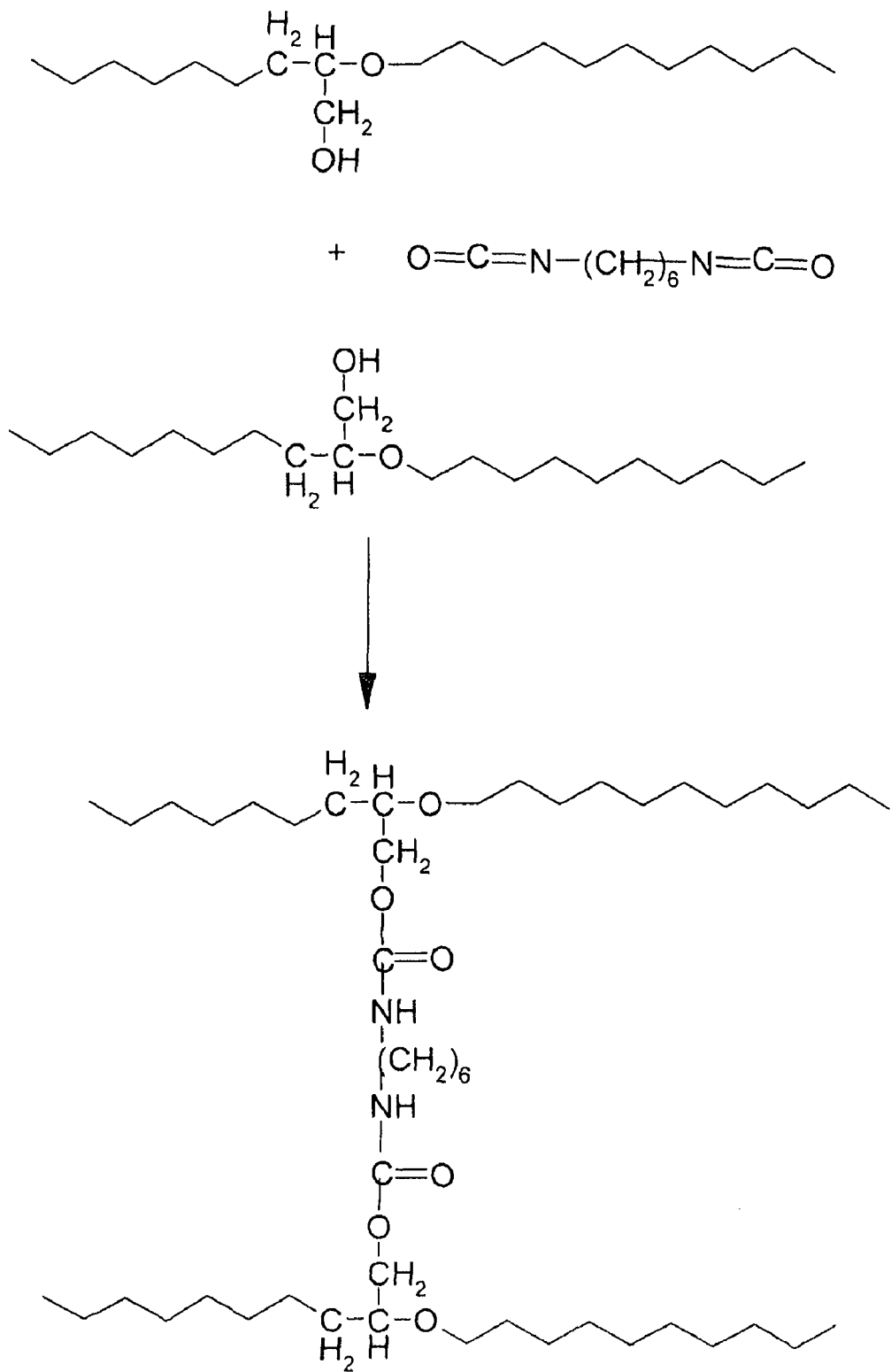
FIG. 1 represents a reaction scheme for a condensation using 1,6-hexamethyl diisocyanate (HMDI).

FIG. 1 represents a reaction scheme for a condensation using 1,6-hexamethylene diisocyanate (HMDI). It is possible to limit the crosslinking density of the material obtained from the copolymer by adding to the copolymer, during crosslinking, a monomer bearing a single isocyanate functional group. It is also possible to limit the crosslinking density by adding to the HMDI and to the copolymer, during the crosslinking step, an α,ω-polyalkylene diol. This polyalkylene diol then plays the role of a spacer.

A copolymer according to the invention bearing OH groups may also be crosslinked by treating the OH groups with 3-isocyanatopropyltriethoxysilane (for example sold by the company ABCR under the reference SII6455). A U(OH) repeat unit thus treated gives the repeat unit represented by the following formula U(1):

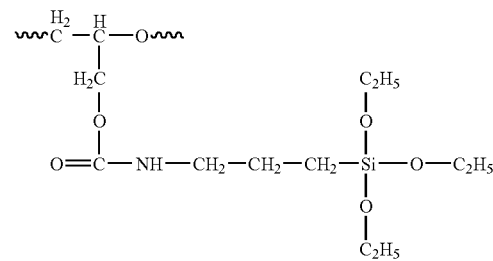

Such a repeat unit U(1) allows crosslinking by acid-catalyzed hydrolysis of the —O—C$_2$H$_5$ functional groups. The crosslinked material that results therefrom comprises CP chains linked by X segments, satisfying the formula:

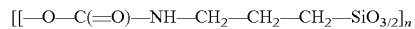

In a variant, it is possible to add tetraethoxysilane to a polymer comprising U(1) repeat units and then to carry out the hydrolysis/condensation of the —O—C$_2$H$_5$ functional groups. A silica network interconnected with the polyether chains is thus created.

A copolymer according to the invention may be cationically crosslinked under UV irradiation when R' is an epoxy group or a vinyl ether group capable of cationically polymerizing under UV and in the presence of a photoinitiator.

When R' is a vinyl ether group CHR$^1$=CR$^2$—O—, the side group of the repeat unit is —CH$_2$—O—CR$^2$=CHR$^1$. The linking group formed by the reaction between two such groups may be represented by:

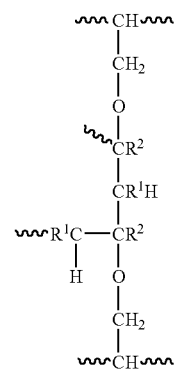

It is possible to limit the crosslinking density of the material by adding to the copolymer, during the crosslinking step, a monomer bearing a single polymerizable functional group of the same nature as the group R' or an oligomer bearing two terminal functional groups of the same nature as the group R' (for example, the poly(1,4-butanediol)divinyl ether sold for example under the reference 41, 017-9 by Aldrich, when R' is of the vinyl ether type].

When R' is an epoxy ether group, the side group of the repeat unit is

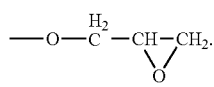

The linking group formed by the reaction between two such groups may be represented by:

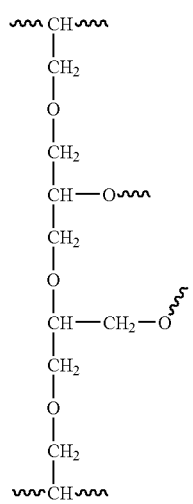

When R' is a vinyl ether functional group, the copolymer may be crosslinked by a donor/acceptor reaction by adding, to the reaction medium during the crosslinking, a maleimide, a maleic anhydride or a bismaleimide, satisfying one of the formulae:

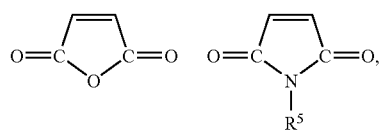

or a maleimide/bismaleimide mixture, $R^5$ representing H, an alkyl, an aryl, an oligosiloxane or an N-alkylmaleimide, N-arylmaleimide or N-oligosilylmaleimide. It may also be advantageous to use, as photoinitiator, 2,4,6-trimethylbenzoylphenyl-ethylphosphorus oxide (TEPO) with a mercury vapor UV lamp operating between 250 and 440 nm.

The resulting crosslinked polymer may be represented schematically by the following formula, when R is H:

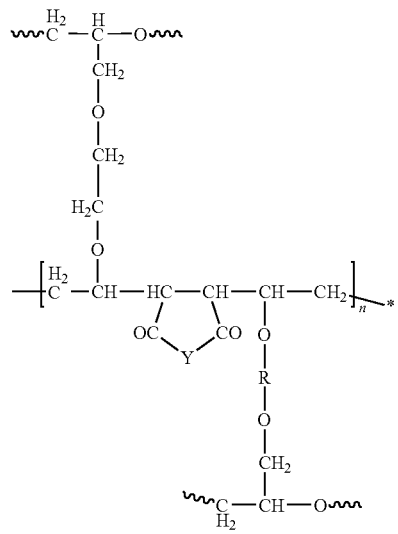

in which Y represents O or $NR^5$ and represents the number of repeat units of the alternating copolymer that links two chains of the uncrosslinked copolymer forming the subject of the present invention (n being from 1 to 50, preferably from 1 to 10). To reduce the stiffness of the copolymer, it is advantageous to use a flexible oligomer of the polydimethoxysilane type terminated in bismaleimide functional groups.

A copolymer according to the invention may be crosslinked by UV-irradiation or thermal radical crosslinking when R' represents an acrylate, methacrylate, cinnamate or styrenyl group. Two groups then together form a chain link, which may be represented by the formula below:

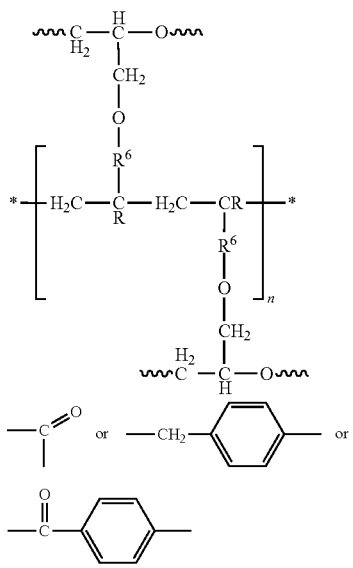

Here again, the crosslinking density of the crosslinked material obtained by crosslinking the ionically conducting copolymer according to the invention may be limited by adding to said copolymer, during the crosslinking step, a monomer bearing a single polymerizable group of the same nature as the R' group of the copolymer.

Finally, several copolymers according to the invention may be blended and then cocrosslinked or associated in order to form semi-interpenetrating or interpenetrating networks.

A cocrosslinked material may be obtained by blending a first copolymer according to the invention having U(R') units with a second copolymer according to the invention having U(R') units, the R' groups of the two copolymers being capable of reacting together, and then by crosslinking the blend.

A semi-interpenetrating network is obtained by crosslinking a membrane consisting of a first copolymer having U(R') units that allow polymerization in the presence of a suitable catalyst and then by swelling said membrane with a solution of a second copolymer having U(R') units that do not allow crosslinking.

An interpenetrating network is obtained by preparing a crosslinked membrane from a first copolymer having U(R') units that allow crosslinking, in the presence of an appropriate catalyst, and by swelling said crosslinked membrane with a solution of a second copolymer having U(R') units that allow crosslinking, in the presence of an appropriate catalyst, and then by crosslinking the second copolymer. In this case, the two networks interpenetrate but they are not linked to each other by covalent bonds. The crosslinking takes place sequentially, one of the polymers being crosslinked before the other. In another method of preparing an interpenetrating network, the crosslinking of the two copolymers is carried out simultaneously. This method of preparation consists for example in blending a copolymer in which the R' groups allow radical photocrosslinking (for example R' is a methacrylate group) with a copolymer in which the R' groups allow cationic photocrosslinking (for example R' bears an OH group). The use of an active photoinitiator in both types of crosslinking with an irradiation wavelength specific to the cationic photocrosslinking and with a wavelength specific to the radical crosslinking makes it possible to create, in a single step, an interpenetrating network in which the two copolymers used as starting products are not linked by covalent bonds because one crosslinkable group R' of one of the copolymers does not copolymerize with the crosslinkable group R' of the other copolymer under the operating conditions.

Examples are given below based on a random copolymer P1 of formula:

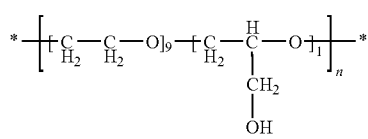

P1

A terpolymer A satisfying the following formula is prepared by esterifying 80% of the OH groups of the polymer P1 in lithium ester sulfate (—O—SO$_3$Li) form:

Terpolymer A

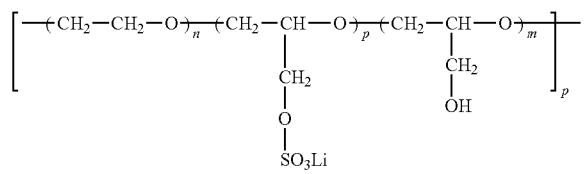

A terpolymer B is prepared by treating the polymer P1 with lithium hydride LiH so as to convert 80% of the alcohol groups into lithium alcoolate (-O$^-$Li$^+$) groups, and then 2-chloroacetonitrile ClCH$_2$CN is added in a stoichiometric amount relative to the alcoolate functional groups.

Terpolymer B

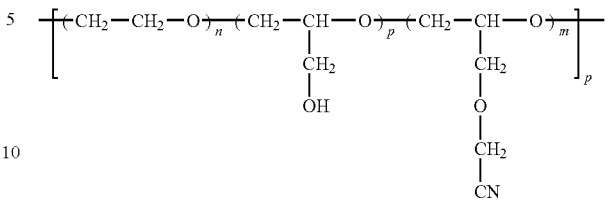

A terpolymer C is prepared by esterifying some of the CH$_2$OH groups of the polymer P1 with a cyanoalkanoic acid satisfying the general formula CN—(CH$_2$)$_n$—COOH.

Terpolymer C

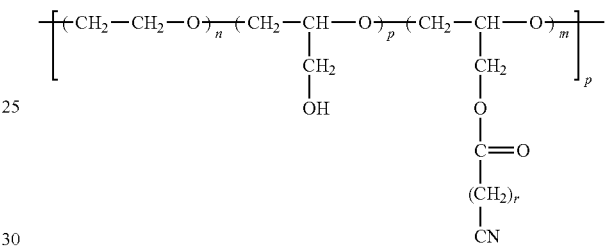

Cocrosslinking may be obtained by blending terpolymer A with terpolymer B or C in dichloromethane in a 1/1 weight ratio and then by adding an HMDI diisocyanate, in a stoichiometric amount of diisocyanate functional groups relative to the OH functional groups, in the presence of dibutyltin dilaurate as catalyst. The solution thus obtained is then poured over a Teflon-coated surface bounded by a glass ring, the dichloromethane is evaporated, and the crosslinking is left to take place over 48 hours.

An interpenetrating network may be obtained by crosslinking, as previously, terpolymer A with a stoichiometric amount of HMDI diisocyanate functional groups in the presence of the catalyst. After crosslinking, the crosslinked membrane is swollen with a solution of terpolymer B or C, HMDI and catalyst in dichloromethane. After evaporation of the solvent, the membrane is left to crosslink at room temperature for 72 hours.

A semi-interpenetrating network may be obtained by crosslinking, as previously, terpolymer A with a stoichiometric amount of HMDI in the presence of the catalyst. After crosslinking, the crosslinked membrane is swollen with a solution of terpolymer B or C in dichloromethane. After evaporation of the solvent, a semi-interpenetrating network is obtained.

A copolymer according to the invention is particularly useful for producing an ionically conducting material.

An ionically conducting material according to the invention consists of at least one copolymer according to the invention or of a material obtained by crosslinking such a copolymer. In such a material, the —CH$_2$—O—SO$_3^-$Li$^+$ ionic groups impart cationic conduction. The conduction depends on the O/Li ratio, in which O represents the number of solvating oxygen atoms and Li represents the number of Li atoms. The number of solvating oxygen atoms is defined relative to the copolymer constituting the ionically conducting material, directly or after crosslinking. This is the number of oxygen atoms provided by the chain consisting of the —O—C—C— groups provided by the U(R) units, the U(Li) units and the optional (UR') units. The Li atoms are provided by the U(Li) units. In other words:

$$\frac{O}{Li} = \frac{N(R) + N(Li) + N(R')}{N(LI)}$$

When the O/Li ratio is less than 40, the material has sufficient ionic conductivity to be used as an ionically conducting material, with or without addition of a conventional lithium salt. This result is obtained when the proportion N(Li) of U(Li) units is such that N(Li)≧2.5% relative to the total number of repeat units in the copolymer before any crosslinking.

When the O/Li ratio of the copolymer is greater than 40, that is to say when N(Li)<2.5%, it is preferable to add a lithium salt in order to form the ionically conducting material. Said lithium salt may be chosen from the salts conventionally used in ionically conducting materials for electrochemical devices operating by lithium ion exchange. As examples, mention may be made of $(CF_3SO_2)_2NLi$ (LiTFSI), $(CF_3SO_2)_2$CHLi (LiTFSM), $(CF_3SO_2)_3$CLi (LiTTFSM), $CF_3SO_3Li$ (TFLi), $LiClO_4$, $LiPF_6$, $LiBF_4$, $LiAsF_6$, LiBOB, LiFSI or LiI. Mention may also be made of the compounds (NC—$CH_2$—$CH_2)_2$NCO—CF($CF_3$)—$SO_3$Li and ($CH_3$O—$CH_2$—$CH_2)_2$NCO—CF ($CF_3$)—$SO_3$Li, the preparation of which is described by X. Ollivrin et al., [Electrochimica Acta, 48, 14-16, 1961-69 (2003)]. The amount of lithium salt added is such that the O/$Li_t$ ratio is less than 40, $Li_t$ representing the total number of Li atoms provided by the U(Li) units and by the salt.

It should be noted that, for a material according to the invention having a given O/Li ratio, the conductivity is improved by the presence of R' groups of the polar type, owing to the fact that polar groups promote the dissociation of the lithium sulfate ionic group —O—$SO_3^-Li_+$ and, where appropriate, the dissociation of the added lithium salt, thereby increasing the effective concentration of $Li^+$ ions. An effect on the conductivity may be obtained over and above 5 mol % of U(R') units in which R' is a polar group.

When an ionically conducting material is a material consisting of a copolymer according to the invention or a material obtained by crosslinking a copolymer according to the invention, its conductivity may be further improved by the addition of a compound having a high complexing power with respect to the lithium cation, such as a crown ether or a polyamine. To give examples, mention may be made of sparteine and tetraazacyclotetradecane (TMTAC) which have the respective formulae:

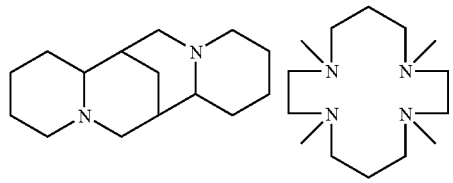

An ionically conducting material according to the invention may furthermore contain a plasticizing agent, chosen for example from aprotic polar liquid solvents, the amount of liquid solvent compatible with use at a temperature of 100° C. being less than 30% by weight, preferably between 5% and 10% by weight, relative to the total mass of the material. As examples, mention may be made of ethylene carbonate, propylene carbonate, γ-butyrolactone, dimethylformamide, N-methyl-pyrrolidone, tetraalkylsulfamides, polyethylene glycol dimethyl ethers having a mass between 200 and 2000 g/mol and, in general, derivatives of low-volatility polar molecules. One of the effects of the plasticizing agents is to reduce the viscosity of the copolymer thereby promoting the mobility of the ions and consequently the ionic conductivity.

An ionically conducting material consisting of a crosslinked copolymer may also be gelled by a solvent or a solvent mixture, chosen for example from aprotic polar liquid solvents, the amount of liquid solvent being less than 85% by weight, preferably between 70% and 80% by weight, relative to the total mass of the material. As examples, mention may be made of ethylene carbonate, propylene carbonate, dialkyl carbonates, γ-butyrolactone, dimethylformamide, N-methyl-pyrrolidone, tetraalkylsulfamides, dimethoxyethane and dioxolane.

An ionically conducting material containing a copolymer according to the invention is generally used in film form when it is intended to form the electrolyte of an electrochemical device. It must therefore have sufficient mechanical strength. A copolymer according to the invention having a molar mass greater than 100,000 g/mol meets this criterion and may be used as such in order to constitute the ionically conducting material.

When a copolymer according to the invention having a molar mass of less than 100,000 g/mol is used to produce a film of ionically conducting material, the latter preferably contains a filler intended to improve the mechanical strength. In this case, the respective proportions of the various repeat units are chosen so as to give priority to the O/Li ratio of the polymer with a view to promoting ionic conduction. The filler may be a silica (for example the battery grade silica sold by Degussa), an alumina, a titanium oxide or a cellulosic reinforcement consisting of cellulose whiskers or microfibrils as described for example in FR-2 841 255.

When a copolymer according to the invention possessing repeat units bearing crosslinkable groups is used to produce a film of ionically conducting material, said copolymer may be used in crosslinked or uncrosslinked form. When the molar mass of the copolymer is less than 100,000 g/mol, it is recommended to use said copolymer in crosslinked form and/or to add to it, as indicated previously, a filler intended to increase the mechanical strength. When the ionically conducting material is obtained by crosslinking a copolymer having a proportion of crosslinkable groups N(R') between 2 and 30%, its mechanical strength is sufficient and makes the addition of a filler optional.

An ionically conducting material according to the invention may be obtained in the form of a film. In one embodiment, the film is obtained by casting or by evaporation. In this case, the method consists in preparing a solution of the various constituents of the material in a solvent, in degassing the solution obtained, then in casting it on a substrate and in letting the film dry by evaporation of the solvent. It is possible to use, as solvent, a volatile solvent such as for example acetonitrile, methanol, acetone, dimethylformamide or dichloromethane.

In another embodiment, a dry blend of the various constituents of the material is subjected to an extrusion operation.

When a material containing a copolymer in crosslinked form is desired, the crosslinking must be carried out after the film has been formed.

An ionically conducting material according to the present invention may be used in film form as an electrolyte in various electrochemical devices that operate by displacement of $Li^+$ ions between two electrodes through an electrolyte. The copolymer may furthermore be used as a conducting binder for the constituent material of one of the electrodes of an electrochemical device or both electrodes.

Among the electrochemical devices in question, mention may be made of rechargeable or nonrechargeable batteries, electrochromic systems, light-modulating systems and supercapacitors.

A battery according to the invention comprises a negative electrode and a positive electrode separated by a solid-polymer electrolyte, the electrolyte comprising an ionically conducting material according to the present invention. Preferably, a crosslinked material obtained from a copolymer according to the invention comprising U(R') units, in which R' is a polar group, is used. The positive electrode consists of a positive electrode active material. It may furthermore contain a copolymer according to the present invention as conducting binder. It may furthermore contain a material imparting electronic conduction. In a rechargeable lithium battery, the anode consists of a film of lithium metal, a lithium alloy or an intermetallic lithium compound. In a lithium-ion battery, the negative electrode consists of a material capable of reversibly inserting lithium ions, such as for example graphite.

An electrochromic system according to the invention comprises a transparent electrode and an electrode consisting of an active material, the color of which varies with the degree of oxidation, the two electrodes being separated by a conducting electrolyte consisting of an ionically conducting material according to the present invention. The transparent electrode may consist for example of an indium tin oxide (ITO) or a fluorine-doped tin oxide (FTO). The other electrode changes color when $Li^+$ ions are inserted into the active material, which may for example be tungsten oxide $WO_3$.

A supercapacitor comprises two carbon-based electrodes separated by an electrolyte. According to the present invention, the electrolyte consists of an ionically conducting material comprising a copolymer according to the present invention in crosslinked form, plasticized by addition of one or more organic solvents. Acetonitrile may be used for example as plasticizing solvent. By using a crosslinked copolymer having a sulfate functional group according to the present invention in the electrolyte, it is possible, by adding a free salt, to modulate the cationic transport and to dispense with the use of a separator, which is necessary in the case of liquid electrolytes.

A copolymer according to the present invention may furthermore be used to produce selective membranes or reference membranes in membrane sensors, for example for measuring the quantity of lithium ions present in a solution. For production of membranes, it is preferable to use a material according to the invention in which the O/Li ratio is between 10 and 30.

A random copolymer according to the invention, denoted hereafter by CP[U(R), U(Li), U(OH)] and consisting of U(R) units, U(Li) units and optionally U(R') units in which the R' substituent is OH [denoted hereafter by U(OH) units], may be obtained by a process comprising the following steps:
1. preparation of a CP[U(R), U(EP)] copolymer consisting of U(R) units and U(EP) units, the U(EP) units being —O—$CH_2$—CH(—$CH_2$Cl)— units;
2. conversion of the —$CH_2$Cl groups of the U(EP) units of the CP[U(R), U(EP)] copolymer into —$CH_2$OH groups; and
3. conversion of at least some of the —$CH_2$OH groups into —$CH_2$—$OSO_3$Li groups.

Preparation of the CP[U(R), U(EP)] copolymer is carried out by copolymerizing ethylene oxide or propylene oxide with epichlorohydrin, according to the method described in particular by J. Furukawa, S. Akutsu and T. Saegusa [Macromol. Chem. 81, 100 (1965)], said method employing the ($FeCl_3$/propylene oxide/d-bornyl ethyl ether) complex for copolymerizing propylene oxide with epichlorohydrin. The preparation is advantageously carried out in solution in toluene, in the presence of a Vandenberg-type polymerization initiator chosen for example from compounds of the trialkylaluminum and diethyl malonate type.

Conversion of the —$CH_2$Cl groups may be carried out using a method described by H. L. Cohen [Journal of Polymer Science: Polymer Chemistry Edition, Vol. 13, 1993-2000 (1975)]. Said method consists in reacting the CP[U(R), U(EP)] copolymer with potassium acetate in methoxyethoxyethanol. The copolymer is dissolved in the solvent at 100° C. under a stream of argon. The potassium acetate is added in excess (3 times relative to stoichiometry) to the mixture, which is heated to 175° C. and maintained at this temperature for 6 hours. After returning to room temperature, the copolymer is precipitated in ether and dried under vacuum. The reaction scheme is indicated below:

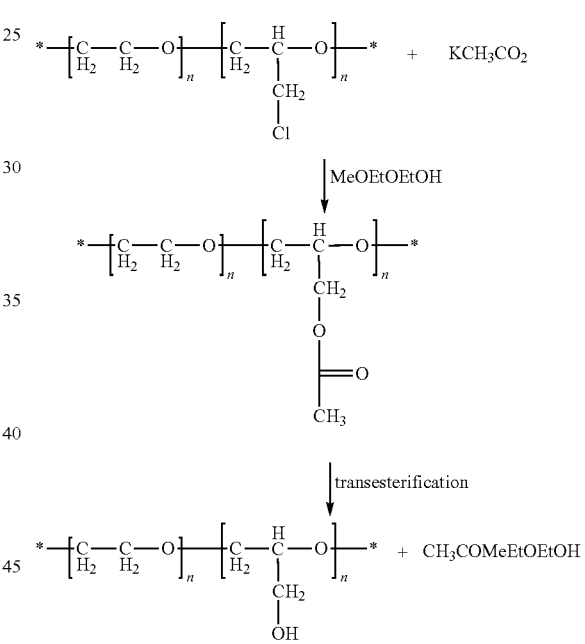

According to another embodiment, a block copolymer according to the invention, denoted hereafter by CP[U(H), U(Li), U(OH)] and consisting of U(R) units in which R is H and which are denoted by U(H), U(Li) units as defined above and, optionally, U(OH) units as defined above, may be obtained by a method comprising the following steps:
1. preparation of a poly(ethylene oxide) having —$O^-M^+$ reactive end groups;
2. preparation of a poly(ethylene oxide-co-Pglycidol) block copolymer by reacting the poly(ethylene oxide) having —$O^-M^+$ reactive end groups with a protected glycidol (denoted by Pglycidol), M' being an alkali metal ion;
3. deprotection of the lateral substituents of the repeat units coming from the protected glycidol, in order to convert said lateral substituents into —$CH_2$OH substituents; and
4. conversion of at least some of the —$CH_2$OH groups into —$CH_2$—O—$SO_3$Li groups.

The preparation of the poly(ethylene oxide) having —O⁻M⁺ reactive end groups may be carried out by reacting a poly(ethylene oxide) with an MOH according to the following reaction scheme:

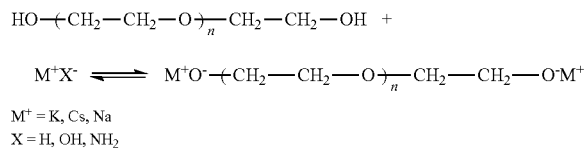

M⁺ = K, Cs, Na
X = H, OH, NH₂

The preparation of the poly(ethylene oxide co-Pglycidol) block copolymer may be carried out by reacting the poly(ethylene oxide) having —O⁻M⁺ reactive end groups with a protected glycidol, according to the following reaction scheme:

The lateral substituents of the repeat units coming from the protected glycidol may be deprotected by a succession of steps consisting in:

- reacting the poly(ethylene oxide-co-Pglycidol) copolymer with formic acid in order to convert the $C_2H_5$—O—CH($CH_3$)—O— terminal groups of the lateral substituents, and thus the —O⁻M⁺ groups of the ends of the main chain, into O=CH—O— groups;
- reacting the copolymer obtained with KOH (2N) in order to convert the O=CH—O— end groups into —O⁻K⁺ groups; and
- replacing the K⁺ ion with an H⁺ on an ion exchange resin, it being possible for said succession of steps to be represented by the following reaction scheme:

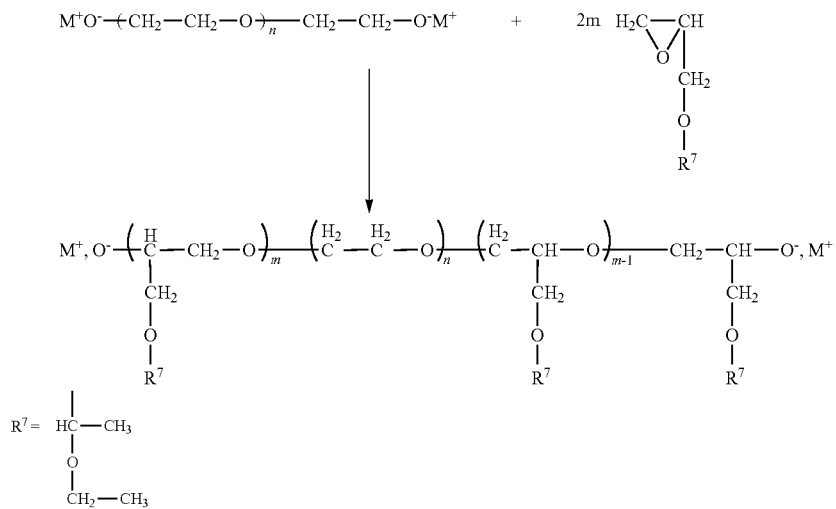

The protected glycidol may be obtained for example by reacting glycidol with an ethyl vinyl ether in the presence of p-toluenesulfonic acid.

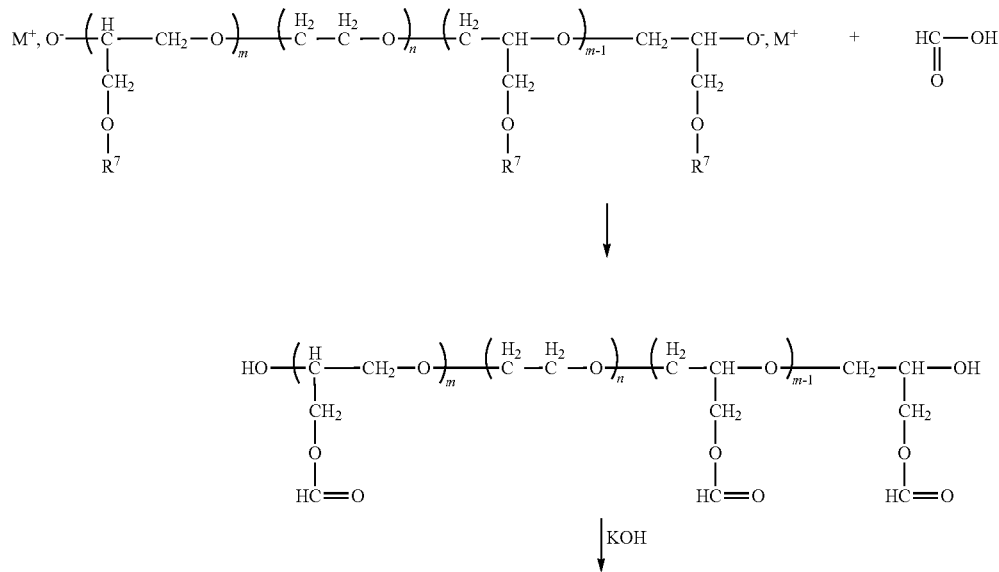

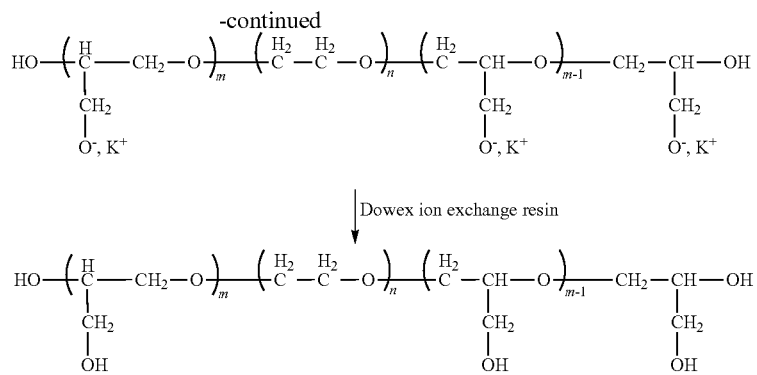

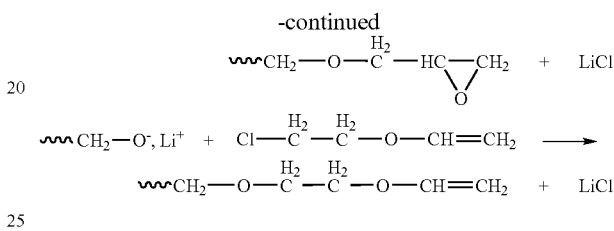

In the two embodiments described above [preparation of a random copolymer obtained from ethylene oxide or propylene oxide and epichlorohydrin, and preparation of a block copolymer obtained from polyethylene oxide and glycidol], the conversion of the —CH$_2$OH groups into —CH$_2$—O—SO$_3$Li groups is carried out in two steps. During a first step, the OH group is esterified by addition of trimethylsilyl chlorosulfonate (CH$_3$)$_3$Si—SO$_3$Cl in anhydrous medium and under a stream of an inert gas. The polymer is thus obtained in silylated sulfonate ester form bearing —CH$_2$—O—SO$_3$—Si(CH$_3$)$_3$ side groups. During the second step, the lithium sulfate —CH$_2$—O—SO$_3$—Li groups are generated by treating the silylated ester groups with LiOH.

For the 1st step, a solvent insensitive or barely sensitive to acids is chosen, for example a chlorinated solvent such as dichloromethane. It is preferable to add the trimethylsilyl chlorosulfonate slowly to the copolymer because of the highly exothermic nature of the reaction. A slight excess of trimethylsilyl chlorosulfonate is used in order to take account of traces of water. For the 2nd step, distilled water is used as solvent. The neutralization is carried out by adding LiOH (for example in the form of 1M aqueous solution), checking the acid-based titration using a pH-meter. After neutralization, the water is evaporated and acetonitrile which dissolves the lithiated polymer, is added. The mineral impurities (LiCl, LiOH, LiSO$_4$) are insoluble in acetonitrile and can therefore be removed by filtration.

When the intended copolymer contains only U(R) or U(H) units and U(Li) units, the reactants are used in sufficient amount to convert all the —C$_2$OH groups into —CH$_2$—O—SO$_3$Li groups. The use of a substoichiometric amount of reactant makes it possible to retain —CH$_2$OH groups, which may remain as such in the copolymer, or via which different R' groups may be attached to the main chain of the copolymer.

To obtain a copolymer in which R' is an epoxy group or a vinyl ether group, a copolymer in which R' is an OH group is reacted with LiH in anhydrous medium in order to convert the —CH$_2$OH group into a lithium alcoolate, and then the alcoolate thus formed is reacted, respectively, with epichlorohydrin or with chloroethyl vinyl ether in order to obtain a final group R' of the epoxy type or of the vinyl ether type. The reaction scheme is the following:

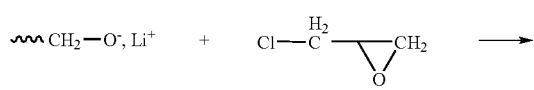

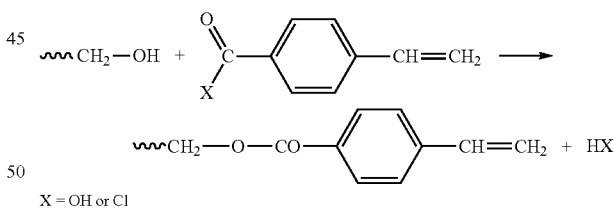

To obtain a copolymer in which R' is an acrylate or methacrylate group, a copolymer in which R' is an OH group is reacted with acrylic acid or methacrylic acid. In this case, the reaction is carried out under reduced pressure in order to remove the water formed and thus shift the esterification equilibrium, in particular by azeotropic distillation with benzene using a Dean-Stark trap. An alternative consists in using the chloride or anhydride of acrylic acid or methacrylic acid, optionally in the presence of pyridine as catalyst for the esterification reaction.

To obtain a copolymer in which R' is a styryl group, a copolymer in which R' is an OH group is reacted with LiH in order to convert the —CH$_2$OH group into a lithium alcoolate, followed by reaction with chloromethyl styrene. It is also possible to introduce a styryl group by esterifying the —CH$_2$OH group of the polymer with p-vinylbenzoic acid according to the following reaction scheme:

A copolymer in which the substituent R' is a nitrile group may be obtained by conversion of a repeat unit in which R' is OH by reaction with LiOH, followed by reaction of the lithium alcoolate formed with chloroacetonitrile.

The present invention will be illustrated by the following examples, to which it must however not be limited.

Example 1

Preparation of a Poly(Ethylene Oxide-Rand-Glycidol) Random Copolymer

The method employed was similar to the method described by Cohen et al. (mentioned above).

Introduced into a 500 ml three-necked flask were 200 ml of diethylene glycol monomethyl ether, which were then heated to 100° C. under a stream of argon and with stirring. Next, 10 g of a poly(ethylene oxide-co-epichlorohydrin) copolymer in which the number of moles of chlorine functional groups was 0.0 were introduced, which copolymer may be represented by the following semideveloped formula (I):

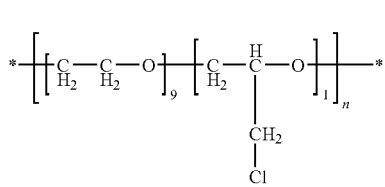

(I)

After the copolymer (I) was dissolved, 5.88 g of potassium acetate (0.06 mol) were added, the reaction mixture was heated to 175° C. and maintained at this temperature for 6 hours. Next, the reaction mixture was left at room temperature and precipitated in ether. The copolymer obtained was separated by filtration and vacuum-dried for 12 hours at 40° C. It comprised 90% by number of oxyethylene units (corresponding to the U(R) units of the general formula) and 10% of U(R') units in the form of U(OH) units. It may be represented by the following semideveloped formula (II):

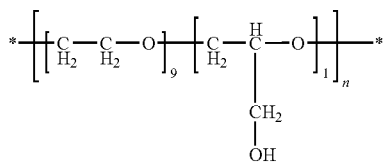

(II)

Example 2

Preparation of a Poly(Ethylene Oxide-Rand-Lithium Glycidyl Sulfate) Random Copolymer Introduced into a 500 ml three-necked flask containing 250 ml of dichloromethane and 1.93 g of Amberlist 21® resin were 3.63 g of copolymer (II) (corresponding to $7.71 \times 10^{-3}$ mol of OH groups). The flask was placed in a bath of ice and a stream of argon flowed through the flask throughout the entire duration of the synthesis.

Introduced into a dropping funnel were 40 ml of dichloromethane and 1.25 ml of trimethylsilyl chlorosulfonate (corresponding to an excess of 5% relative to stoichiometry), and then the solution was added to the three-necked flask drop by drop. The mixture was left under a stream of argon for 1 hour after the addition of trimethylsilyl chlorosulfonate was completed. Next, the solvent was removed with a vacuum rotary evaporator, the residue was taken up in 100 ml of distilled water, and then the solution obtained was neutralized by adding a 1 mol/l aqueous LiOH solution. The addition of LiOH was monitored using a pH-meter and stopped when a pH above that of distilled water was obtained.

The water was then removed with a vacuum rotary evaporator, the residue was taken up in acetonitrile and the solution obtained was centrifuged. This solution was then filtered twice on a PVDF filter having an average porosity of 1 μm, then once on a PVDF filter having an average porosity of 0.45 μm and once on a PVDF filter having an average porosity of 0.22 μm. The copolymer thus obtained was precipitated in ether, then dried in a Büchi vacuum chamber at 40° C., and finally stored in a glove box under argon. The polymer (III) obtained comprised 90% by number of oxyethylene units (corresponding to the U(R) units of the general formula) and 10% of U(Li) units, and it may be represented by the following semideveloped formula (III):

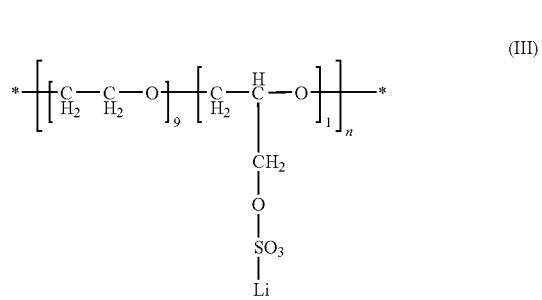

(III)

Example 3

Preparation of Poly(Ethylene Oxide-Rand-Lithium Glycidyl Sulfate-Rand-Glycidol) Random Copolymers The operating procedure of Example 2 was repeated several times, modifying the respective amounts of the reactants so as to convert only some of the ethylene glycol units into lithium sulfated ethylene glycol units. The particular operating conditions and the results of the various trials are given in the following table: $n_{OH}$ represents the number of moles of OH provided by the copolymer (II), U(Li) represents the percentage of U(Li) units relative to the total of the units other than the oxyethylene units, and % U(OH) represents the percentage of U(OH) units relative to the total of the units other than the oxyethylene units.

| Copolymer (II) | | Amberlyst 21 | $(CH_3)_3SiS-O_3Cl$ | Final copolymer | | |
|---|---|---|---|---|---|---|
| Mass (g) | $n_{OH}$ | Mass (g) | Volume (ml) | % U (Li) | % U (OH) | Formula |
| 3.32 | $7.05 \times 10^{-3}$ | 1.76 | 0.92 | 85 | 15 | IV |
| 3.28 | $6.99 \times 10^{-3}$ | 1.75 | 0.57 | 50 | 50 | V |
| 2.32 | $4.92 \times 10^{-3}$ | 1.23 | 0.27 | 33 | 67 | VI |
| 2.62 | $5.56 \times 10^{-3}$ | 1.39 | 0.21 | 25 | 75 | VII |

The semideveloped formulae of the various copolymers obtained are given below:

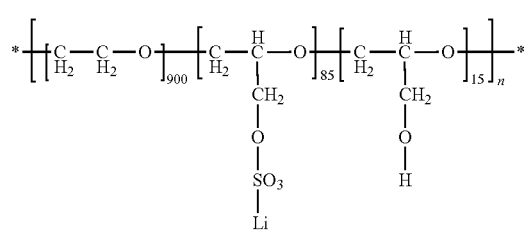

(IV)

-continued

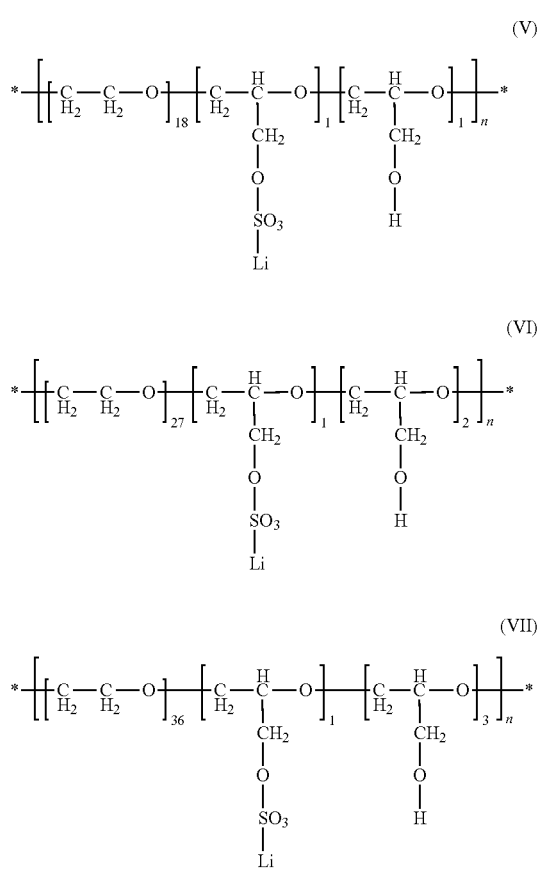

(V), (VI), (VII)

$$\text{VIII} \quad *\text{-}[\text{-}(CH_2\text{-}CH_2\text{-}O)_n\text{-}(CH_2\text{-}CH\text{-}O)_p\text{-}(CH_2\text{-}CH\text{-}O)_m\text{-}]_p\text{-}*$$

with side chains: $-CH_2-O-SO_3Li$ and $-CH_2-O-CH_2-CN$

Example 4

Preparation of Poly(Ethylene Oxide-Rand-Lithium Glycidyl Sulfate-Rand-Cyanomethyl Glycidyl Ether) Random Copolymers Introduced into a 250 ml flask were 1 g of copolymer VI ($1.35 \times 10^{-3}$ mol of OH), 0.3 g of lithium hydroxide, 5 ml of water and 60 ml of dichloromethane. The reaction mixture was heated at 60° C. for 1 hour and then an azeotropic distillation of dichloromethane and water was carried out. After complete removal of the water, the reaction mixture was cooled to room temperature under an atmosphere of argon. Next, 0.1 ml of chloroacetonitrile was added. After 30 min, the reaction mixture was heated to 60° C. and maintained at this temperature for 24 h. After cooling, the solution obtained was centrifuged, then filtered twice on a PVDF filter having an average porosity of 1 μm, once on a PVDF filter having an average porosity of 0.45 μm and once on a PVDF filter having an average porosity of 0.22 μm, before being precipitated in diethyl ether. The precipitated copolymer was dried in a Büchi vacuum chamber at 40° C. and finally stored in a glove box under argon. The polymer (VII) obtained comprised 90% by number of oxyethylene units (corresponding to the U(R) units of the general formula), 3.3% of U(Li) units and 6.6% of U(R') units in which R' was CN. It may be represented by the following semideveloped formula:

Example 5

Preparation of Crosslinked Copolymers

Copolymers IV, V and VI were crosslinked by reaction of the OH groups with 1,6-diisocyanatohexane (HMDI).

While operating in a glove box under an atmosphere of argon, a solution of the copolymer in dichloromethane was prepared, dibutyltin dilaurate as catalyst was added, and then the solution was poured onto a Teflon-coated glass surface bounded by a Teflon-coated glass ring. After evaporation of the dichloromethane, the system was left at room temperature and crosslinking took place spontaneously in 48 hours.

The conditions specific to each copolymer are given in the following table.

| Initial copolymer | Mass (g) | HMDI Mass (g) | Catalyst Mass (g) | Crosslinked copolymer |
|---|---|---|---|---|
| IV | 0.738 | 0.017 | $6.4 \times 10^{-3}$ | IV-R |
| V | 0.6492 | 0.053 | 0.01993 | V-R |
| VI | 0.3735 | 0.0419 | 0.0157 | VI-R |

The content of insolubles of the materials obtained by crosslinking copolymers IV to VI was determined and compared with that of the material obtained by crosslinking copolymer II and copolymer III. The uncrosslinked copolymers are soluble in dichloromethane. The content of insolubles was determined using the following operating procedure. A mass mi of the crosslinked copolymer in film form was taken and immersed in dichloromethane for 12 hours, the film was then removed from the flask and placed in an oven at 70° C., then weighed, the final mass being denoted by mf. The content of insolubles was 100×mf/mi.

Figure 2:
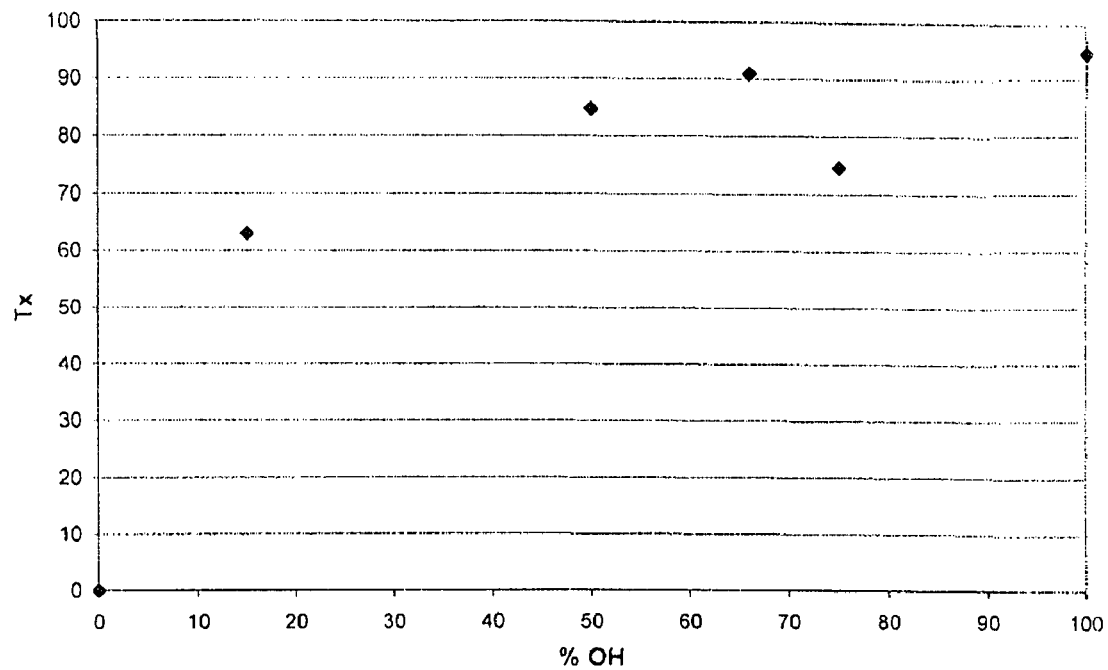
FIG. 2 shows the variation in the content of insolubles Tx as a function of the percentage content of crosslinked OH functional groups (% OH), which corresponds here to the percentage of crosslinkable functional groups, taking into account the amount of HMDI introduced during crosslinking.
Figure 3:
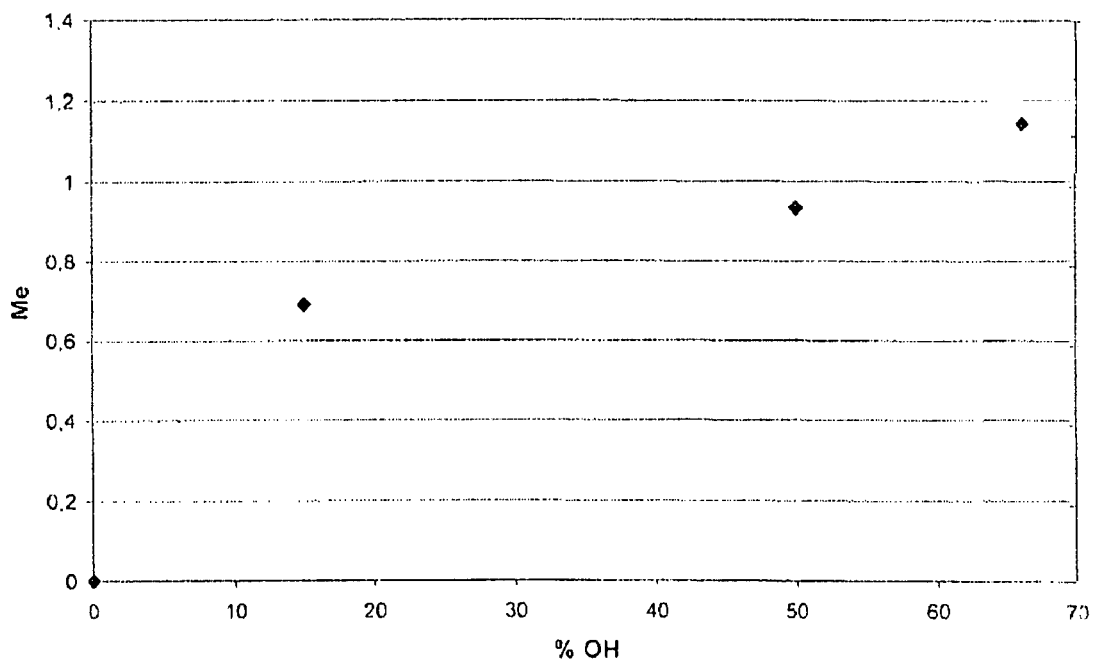
FIG. 3 shows the variation of the elastic modulus at 100° C. (Me in MPa) as a function of the percentage of crosslinked OH functional groups (% OH).
Figure 4:
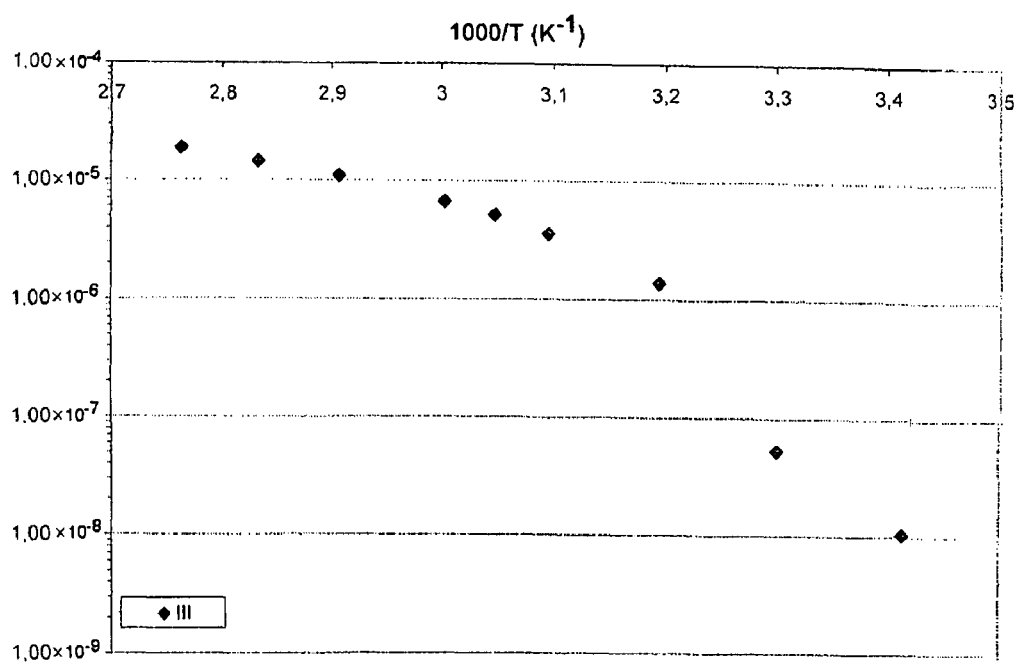
FIGS. 4 to 7 show the variation of the conductivity as a function of temperature for each of the materials tested. In each of the figures, the conductivity C (expressed in S/cm) is plotted on the y-axis and the temperature is plotted on the x-axis in 1000/T form (T being in $K^{-1}$).
Figure 5:
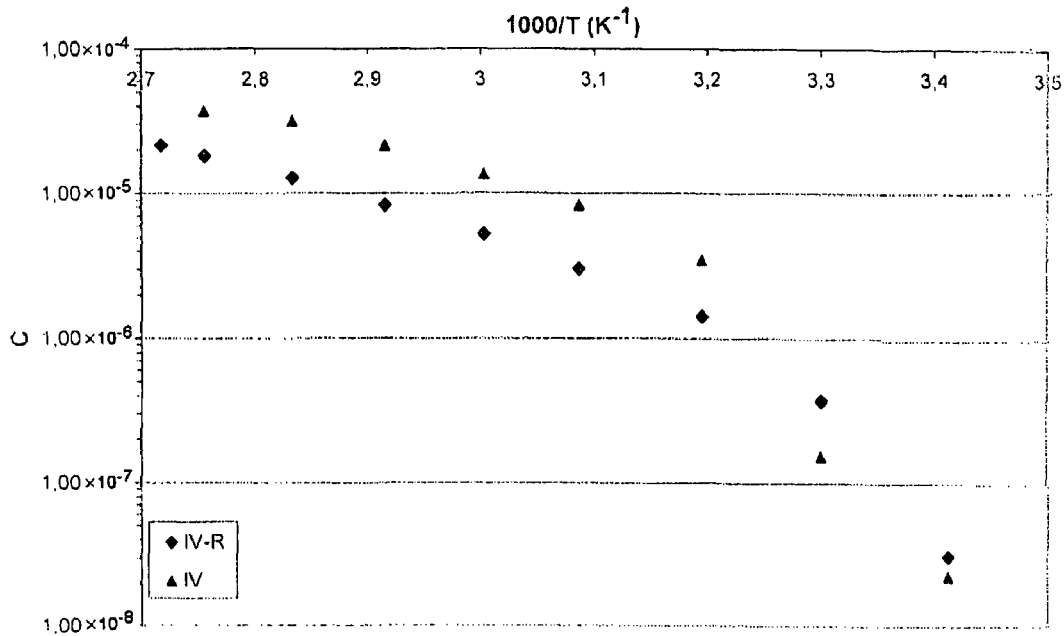
Figure 6:
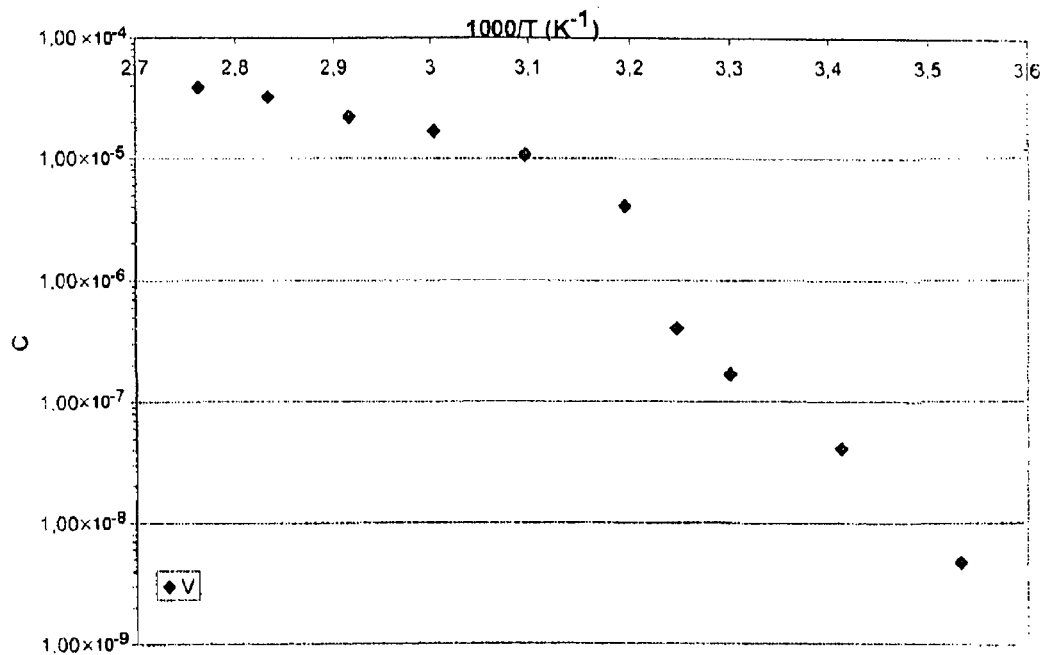
Figure 7:
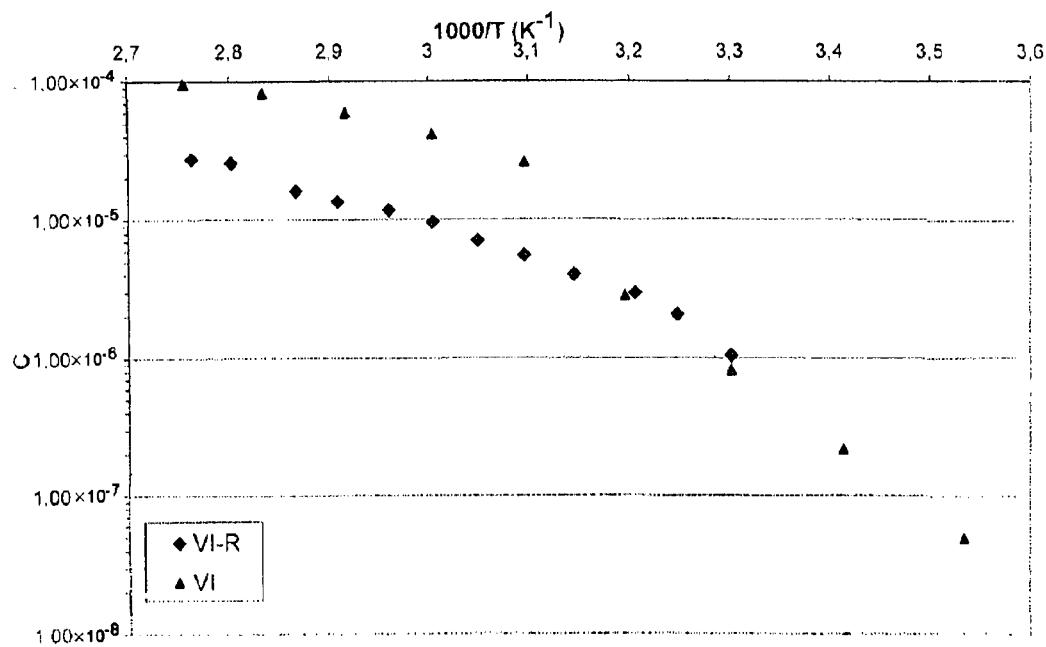

FIG. 2 shows the variation in the content of insolubles Tx as a function of the percentage content of crosslinked OH functional groups (% OH), which corresponds here to the percentage of crosslinkable functional groups, taking into account the amount of HMDI introduced during crosslinking. It may be seen that the content of insolubles of the crosslinked material increases with the proportion of crosslinkable OH functional groups of the uncrosslinked copolymer. To verify the influence of the proportion of crosslinkable functional groups, the elastic modulus of the crosslinked materials obtained from copolymers IV to VI was determined and compared with the modulus of copolymer III (not crosslinkable since it does not have a crosslinkable group). FIG. 3 shows the variation of the elastic modulus at 100° C. (Me in MPa) as a function of the percentage of crosslinked OH functional groups (% OH). The elastic modulus is zero for uncrosslinked copolymer III and increases with the number of crosslinked OH functional groups, that is to say with the number of urethane bridges.

Example 6

Measurement of the Ionic Conductivity

The ionic conductivity of various materials was measured in a thermostated enclosure from 90° C. to 20° C. every 10° C. FIGS. 4 to 7 show the variation of the conductivity as a function of temperature for each of the materials tested. In each of the figures, the conductivity C (expressed in S/cm) is plotted on the y-axis and the temperature is plotted on the x-axis in 1000/T form (T being in $K^{-1}$). The following table indicates the material tested, the O/Li ratio of said material, the conductivity at various temperatures, and the number of the figure showing the variation in conductivity.

| Material | % OH | % SO$_4$Li | O/Li | C at 90° C. (S/cm) | C at 60° C. (S/cm) | FIG. |
|---|---|---|---|---|---|---|
| III | 0 | 100 | 10 | $1.9 \times 10^{-5}$ | $5.7 \times 10^{-6}$ | 4 ♦ |
| IV | 15 | 85 | 12 | $3.7 \times 10^{-5}$ | $1.4 \times 10^{-5}$ | 5 ▲ |
| IV-R | 15 | 85 | 12 | $1.8 \times 10^{-5}$ | $5.2 \times 10^{-6}$ | 5 ♦ |
| V | 50 | 50 | 20 | $3.9 \times 10^{-5}$ | $1.7 \times 10^{-5}$ | 6 ♦ |
| VI | 67 | 33 | 30 | $9.6 \times 10^{-5}$ | $4.2 \times 10^{-5}$ | 7 ▲ |
| VI-R | 67 | 33 | 30 | $2.8 \times 10^{-5}$ | $9.5 \times 10^{-6}$ | 7 ♦ |

These results show that the reduction in the number of ionic groups in a copolymer, which would result in a reduction in ionic conductivity of the material, all of the things being equal, is compensated for by the presence of the OH polar groups, which increases the solvating power associated with the anion. This has the effect of promoting dissociation of the ionic groups and thus increasing the conductivity. They also show that the crosslinking of a copolymer reduces the ionic conductivity by a non-negligible factor.

Example 7

Influence of a Plasticizer on the Ionic Conduction

The ionic conduction of a material consisting of a mixture of copolymer III and polyethylene glycol dimethyl ether of 500 molar mass (PEG500), in which the PEG 500 represented 10% by mass, was determined. The conductivity was compared with that of copolymer III taken in isolation.

The results are shown in FIG. 8 in which the curve depicted by the triangles relates to the copolymer III/PEG 500 mixture and the curve depicted by the diamonds relates to copolymer III. It is apparent that the addition of the plasticizer improves the conductivity. This result stems from the fact that the addition of plasticizer reduces the viscosity of the material and promotes the mobility of the Li$^+$ ions and consequently the conductivity.

Example 8

Influence of a Complexing Agent on the Ionic Conduction

The ionic conduction of a material consisting of a mixture of copolymer III and sparteine, in which sparteine represented 29% by mass (1/1 molar ratio between the number of lithium sulfate functional groups and number of sparteine molecules) was determined. The conductivity was compared with that of copolymer III used without a complexing agent.

The results are shown in FIG. 9 in which the curve depicted by the triangles relates to the copolymer III/sparteine mixture and the curve depicted by the diamonds relates to copolymer III. It is apparent that the addition of complexing agent improves the conductivity. This result stems from the fact that the addition of complexing agent probably increases the dissociation of the salt and also probably reduces the viscosity of the material. The plasticizing nature of the complexing agent used promotes the mobility of the Li$^+$ ions and consequently the conductivity.

Example 9

Influence of a Complexing Agent on the Ionic Conduction

The ionic conduction of a material consisting of a mixture of copolymer III and tetraazacyclotetradecane (TMTAC), in which TMTAC represented 31.5% by mass (1/1 molar ratio between the number of lithium sulfate functional groups and TMTAC) was determined. The conductivity was compared with that of copolymer III taken in isolation.

The results are shown in FIG. 10 in which the curve depicted by the triangles relates to the copolymer III/TMTAC mixture and the curve depicted by the diamonds relates to copolymer III. It is apparent that the addition of complexing agent improves the conductivity. This result stems from the fact that the addition of complexing agent probably increases the dissociation of the salt and also probably reduces the viscosity of the material. The plasticizing nature of the complexing agent used promotes the mobility of the Li$^+$ ions and consequently the conductivity.

Example 10

Preparation of a Poly[(Ethylene Oxide)-Block-(Glycidol-Rand-Lithium Glycidyl Sulfate)] Copolymer Preparation of a Protected Glycidol Introduced into a 500 ml three-necked flask fitted with a refrigerated column were 66.24 ml (74 g/1 mol) of glycidol and then 204 ml (144 g/2.08 mol) of ethyl vinyl ether (EVE). With magnetic stirring, 1 g (0.058 mol) of p-toluenesulfonic acid (pTSA) was added and then the mixture was heated at reflux for 2 h 40 min. After cooling, the solution was neutralized by ≈215 ml of an aqueous solution saturated with sodium hydrogen carbonate. The organic phase was washed twice with distilled water then dried over anhydrous sodium sulfate. The remaining EVE was removed by distillation (T=34° C.; P=760 mmHg) and the protected glycidol (Pglycidol) was purified by vacuum distillation (T=50° C.; P=7 mmHg). Only the core fraction was retained, the impurities remaining in the flask or the top fraction.

The raw product had an orange color and then became translucent after distillation. 140 g PGL were recovered, i.e. a yield close to 96%.

Preparation of a Macroinitiator

A macroinitiator was prepared for the synthesis of a copolymer, according to the following scheme:

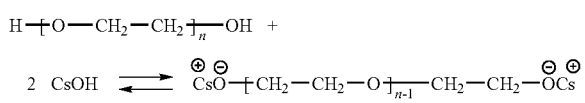

(PEO 4000) $5 \times 10^{-4}$ mol) and 0.149 g ($10^{-3}$ mol) of cesium hydroxide. The mixture was reacted at 80° C. for 3 hours with magnetic stirring. The water formed was removed by azeotropic distillation with toluene.

Macroinitiators were synthesized with various molar masses between 400 and 10,000 g/mol. The corresponding values of n are indicated in the table below.

Synthesis of a Block Copolymer

The macroinitiators as prepared above were used to synthesize poly(ethylene oxide-block-polypglycidol) block copolymers denoted by B1 to B8 comprising various numbers n of oxyethylene units and various numbers m of Pglycidol units. The copolymers are identified in the table below. "Pglycidol unit" denotes the unit corresponding to the opening of the protected glycidol.

| Copol. | n | m |
| --- | --- | --- |
| B1 | 8.7 | 15 |
| B2 | 8.7 | 100 |
| B3 | 45 | 100 |
| B4 | 45 | 100 |
| B5 | 90.5 | 166 |
| B6 | 90.5 | 50 |
| B7 | 90.5 | 100 |
| B8 | 56.8 | 100 |

Introduced into a 250 ml flask fitted with a distillation column were 100 ml of toluene and 7.3 g ($5 \times 10^{-2}$ mol) of PGL then 30 ml of azeotrope were distilled (atmospheric pressure; T=110° C.), with magnetic stirring, and the mixture was protected from the moisture of the air by a calcium chloride trap. The solution was then cooled down to 80° C. under argon.

The previously prepared macroinitiator was added to the above solution. The temperature was raised to 100° C. and the solution left to react for 5 hours under an atmosphere of argon. The solvent was then removed by distillation. By an appropriate choice of the ratio of molar concentration of $CH_2$—$CH_2$—O repeat units to the molar concentration of protected glycidol units it is possible to obtain the desired triblock copolymer. For example, to obtain a triblock copolymer with n=45 and m=100, a poly(ethylene oxide)diol of 2000 mass with a concentration of 0.01 mol/l, i.e. a concentration of $CH_2$—$CH_2$—O units of 0.45 mol/l, and a protected glycidol concentration of 2 mol/l are used.

The color and the viscosity of the polymers obtained varied according to the macroinitiator used.

By characterizing the copolymers by $H^1$ and $C^{13}$ NMR, it was possible to monitor the progress of the reaction, observing the reduction and then the disappearance of the peak corresponding to the epoxy ring of the monomer ($H^1$, $C^{13}$: 60.63 ppm, 50.63 ppm).

The reaction products were also analyzed by GPC (gel permeation chromatography) in THF at 25° C. using a set of ultrastyragel columns. GPC analysis of the raw product showed that the reaction product may have one or two distributions. The formation of two distributions stems from parasitic chain transfer reactions during polymerization. One part of the copolymer obtained precipitated in heptane, while the other part dissolved. The two fractions separated in heptane were able to be analyzed by $^1$H NMR characterization. The soluble fraction corresponded to a polyPglycidol PPGL homopolymer and the insoluble product corresponded to the expected PPGL-POE-PPGL triblock copolymer. Since the homopolymer and the copolymer were compatible, the blend may be used as such to prepare an electrolyte for a lithium battery, for an electrochromic system or for a supercapacitor, without the performance characteristics of the electrolyte being affected thereby.

Conversion of the "Protected Glycidol" Groups into —$CH_2OH$ Groups

Introduced into a flask containing 15 g of copolymer B1 were 100 ml of formic acid. The acid was left to act on B1 for 20 minutes at 20° C. The excess acid was then vacuum-evaporated ($T_{amb}$, P=4-5 mmHg). Next, 120 ml of THF and 70 ml of methanol were added before the pH of the solution was brought to 12 by addition of 2M KOH. The addition of KOH was monitored using a pH-meter and stopped when a pH of 12 was obtained.

The solvents were then removed under vacuum ($T_{amb}$; P=4-5 mmHg). An aqueous solution of the polymer was passed over an ion ($H^+$) exchange column (cationic resin regenerated with 2M hydrochloric acid). The water was then removed with a vacuum rotary evaporator, the polymer was deprotected, and the PGL or PGL-POE-PGL was dried under vacuum ($T_{amb}$, P=4-5 mmHg).

Replacement of Some of the OH Groups with Lithium Sulfonate Groups

Introduced into a 500 ml three-necked flask containing 100 ml of dimethyl sulfoxide was 10 g of copolymer B7 (corresponding to $7.71 \times 10^{-3}$ mol of OH groups). Next, the flask was then placed in an ice bath and a stream of argon passed through the flask throughout the duration of the synthesis. A dropping funnel was used to introduce 80 ml of dimethyl sulfoxide and 16.25 ml of trimethylsilyl chlorosulfonate (corresponding to a 5% excess relative to stoichiometry), and then the solution was added drop by drop into the three-necked flask. The mixture was then left under a stream of argon for 1 hour after the addition of trimethylsilyl chlorosulfonate had been completed. Next, the solvent was removed with a vacuum rotary evaporator, the residue was taken up in 100 ml of distilled water and then the solution obtained was neutralized by addition of 1 mol/l aqueous LiOH solution. The addition of LiOH was monitored using a pH-meter and stopped when a pH of greater than 7 was obtained.

The water was then removed with a vacuum rotary evaporator, the residue was taken up in acetonitrile, and the solution obtained was centrifuged, then filtered twice on a PVDF filter having a microporosity of 1 μm, then once on a PVDF filter having a microporosity of 0.45 μm and once on a PVDF filter having a microporosity of 0.22 μm. The copolymer thus obtained was precipitated in ether, then dried in a Büchi vacuum chamber at 40° C. and finally stored under argon in a glove box.

Example 11

Preparation of a Poly(Ethylene Oxide-Rand-Lithium Glycidol Sulfate-Rand-Cyanomethyl Glycidol Ether) Random Copolymer Introduced into a 250 ml flask were 1 g of the copolymer obtained at the end of Example 10, 5 ml (0.01 mol) of potassium hydroxide and 50 ml of toluene. An azeotropic distillation with toluene was carried out under reduced pressure (T=50° C.; P=30-35 mmHg). After the toluene had been completely removed, 40 ml of THF, predried over sodium, were added, the solution was placed under an argon atmosphere and heated to 55° C. Next, 0.63 ml (0.01 mol) of chloroacetonitrile was introduced before the reaction mixture was heated at reflux (T=60° C.). The solvent was then removed with a vacuum rotary evaporator. The copolymer obtained may be represented by formula VIII given above.

Example 12

Synthesis of Poly(Ethylene Oxide-Rand-Glycidol) Random Copolymers

During a first step, a poly[(ethylene oxide)-rand-Pglycidol] random copolymer was prepared.

The polymerization was carried out in a stainless steel autoclave reactor able to withstand a pressure of 100 bar. Mechanical stirring was provided via a magnetic bearing, and the heating by a suitable heating jacket. The reactor was thermostated by a water-cooling circuit controlled by a solenoid valve. The reactants were introduced via a stainless steel lock chamber, prefilled in the glove box with argon. THF—the solvent for the reaction—was distilled beforehand over calcium hydride ($CaH_2$). It was used not only as reaction solvent but also to rinse, before use, the reactor and the lock chambers. The reaction was carried out under argon, the pressure of the reactor varying between 2 and 10 bar during the reaction.

A cesium dialcoolate prepared from poly(ethylene oxide) diol of 400 mass was used. Firstly, 0.53 g of macroinitiator, i.e. $7.9 \times 10^{-4}$ mol, in 150 ml of THF were introduced into the lock chamber. Added in succession were 60 g (1.36 mol) of ethylene oxide and 58 g of (0.4 mol) of protected glycidol. After 12 hours of reaction at 100° C., the mixture was left to return to room temperature and the reaction was deactivated by addition of 5 ml of water.

GPC analysis of the copolymer SP1 obtained, which comprised oxyethylene units and protected glycidol units, showed the weight-average molar mass $M_w$, expressed in polystyrene equivalents, was of the order of 20,000 g/mol.

$C^{13}$ NMR and $H^1$ NMR analysis showed the presence of peaks specific to oxyethylene units (70.5 ppm ($CH_2$—$CH_2$—O) in $C^{13}$; 3.54 ppm ($CH_2$—$CH_2$—O) in $H^1$) and protected glycidol units (99.5 ppm (O—$\overline{CH}$—O), 19.51 ppm ($\overline{CH_3}$—CH<) and 15.04 ppm ($\overline{CH_3}$—$CH_2$—) in $C^{13}$ and 4.6 ppm (O—CH—O), 1.2 ppm ($\overline{CH_3}$—CH<) and 1.1 ppm ($C\overline{H_3}$—$CH_2$—) in $H^1$) in a ratio of 2.6.

During a second step, the "protected glycidol" groups of the polymer SP1 were converted to —$CH_2OH$ groups.

Introduced into a flask containing 15 g of copolymer SP1 were 100 ml of formic acid. The acid was left to act on the SP1 for 20 minutes at 20° C. The excess acid was then vacuum-evaporated ($T_{amb}$; P=4.5 mmHg). Next, 120 ml of THF and 70 ml of methanol were added before the pH of the solution was brought to 12 by addition of 2M KOH. The addition of KOH was monitored using a pH-meter and stopped when a pH of 12 was obtained.

The solvents were then removed under vacuum ($T_{amb}$; P=4-5 mmHg). An aqueous solution of the polymer was treated with a proton ($H^+$) exchange resin (cationic resin regenerated beforehand with 2M hydrochloric acid). The water was then removed with a vacuum rotary evaporator and the deprotected copolymer S1 was dried under vacuum ($T_{amb}$; P=4-5 mmHg).

The invention claimed is:

1. Copolymer wherein its chain comprises:
   repeat units U(R) satisfying the formula: —O—$CH_2$—CHR— in which R is H or $CH_3$, in a molar proportion N(R);
   repeat units U(Li) satisfying the formula: —O—$CH_2$—CH(—$CH_2$—O—$SO_3^-Li^+$)—, in a molar proportion N(Li); and
   repeat units U(R') satisfying the formula: —O—$CH_2$—CH(—$CH_2R'$)— in which R' is OH, in a molar proportion N(R');
   wherein the molar proportions of units U(R), U(Li) and U(R') are such that $70 \leqq N(R) \leqq 95$ and $2.5 \leqq N(Li) \leqq 15$ and $5 \leqq N(R') \leqq 20$ and the ratio O/Li=[N(R)+N(Li)+N(R')]/N(Li) is less than 40, wherein O represents the number of solvating oxygen atoms and Li represents the number of Li atoms.

2. Copolymer according to claim 1, wherein the various repeat units are distributed randomly.

3. Copolymer according to claim 1, wherein it comprises one or more segments consisting of U(R) units, one or more segments consisting of U(Li) units and one or more segments consisting of U(R') units.

4. Method of preparing a copolymer according to claim 2, wherein the method comprises the following steps:
   a. preparing a copolymer consisting of U(R) units and U(EP) units, the U(EP) units being —O—$CH_2$—CH(—$CH_2Cl$)— units;
   b. converting of the —$CH_2Cl$ groups of the U(EP) units to —$CH_2OH$ groups; and
   c. converting of at least some of the —$CH_2OH$ groups into —$CH_2$—O—$SO_3Li$ groups.

5. Method of preparing a copolymer according to claim 3, wherein R is H, wherein the method comprises the following steps:
   a. preparing a poly(ethylene oxide) having —$O^-M^+$ reactive end groups, $M^+$ being an alkali metal ion;
   b. preparing a poly(ethylene oxide-co-Pglycidol) block copolymer by reacting the poly(ethylene oxide) having —$O^-M^+$ reactive end groups with a protected glycidol;
   c. deprotecting the lateral substituents of the repeat units coming from the protected glycidol, in order to convert said lateral substituents into —$CH_2OH$ substituents; and
   d. converting of at least some of the —$CH_2OH$ groups into —$CH_2$—O—$SO_3Li$ groups.

6. Method according to claim 4, wherein the conversion of the —$CH_2OH$ groups into —$CH_2$—O—$SO_3Li$ groups is carried out in two steps:
   during a first step, the OH group is esterified by addition of trimethylsilyl chlorosulfonate $(CH_3)_3Si$—$SO_3Cl$ in anhydrous medium and under a stream of inert gas, in order to obtain a polymer in a form of a silylated ester bearing —$CH_2$—O—$SO_3$—$Si(CH_3)_3$ side groups; and
   during the second step, the silylated ester groups are treated with LiOH in order to obtain the —$CH_2$—O—$SO_3$—Li groups.

7. Method according to claim 4, wherein the reactants are used in substoichiometric amount, for the conversion of the —$CH_2OH$ groups into —$CH_2$—O—$SO_3Li$ groups, so as to obtain a copolymer comprising U(OH) units.

8. Crosslinked material obtained by crosslinking a copolymer according to claim 1.

9. Crosslinked material according to claim 8, further comprising —O—$CH_2$—CH(—X—) repeat units in which —X— is a linking group between the main chains.

10. Crosslinked material according to claim 9, wherein the chain link is a urethane bridge —CO—NH-¯-NH—CO—.

11. Method of preparing a crosslinked material according to claim 10, wherein the method comprises carrying out a condensation reaction between the copolymer, and a diisocyanate O=C=NB¯-N=C=O.

12. Method according to claim 11, wherein the diisocyanate is selected from the group consisting of alkylene diisocyanates, toluene-2,4-diisocyanate, toluene-2,6-diisocynate, oligooxyalkylene-α,ω-diisocyanate and PTHF diisocyanates.

13. Crosslinked material according to claim 9, wherein the linking group X satisfies the formula: $[[-O-C(=O)-NH-CH_2-CH_2-CH_2-SiO_{3/2}]_n$.

14. Method of preparing a crosslinked material according to claim 13, wherein the method comprises reacting the OH groups of the copolymer comprising U(OH) units with 3-isocyanatopropyltriethoxysilane and then carrying out an acid-catalyzed hydrolysis of the ethoxy groups provided by the silane.

15. Crosslinked material according to claim 9, wherein the linking group X is a silica network.

16. Method of preparing a crosslinked material according to claim 15, wherein the method comprises reacting the OH groups of the copolymer with 3-isocyanatopropyltriethoxysilane and then in carrying out a condensation-hydrolysis of the OEt functions.

17. Ionically conducting material consisting essentially of a copolymer according to claim 1.

18. Ionically conducting material according to claim 17, further comprising a lithium salt selected from the group consisting of $(CF_3SO_2)_2NLi$ (LiTFSI), $(CF_3SO_2)_2CHLi$ (LiTFSM), $(CF_3SO_2)_3CLi$ (LiTTFSM), $CF_3SO_3Li$ (TFLi), $LiClO_4$, $LiPF_6$, $LiBF_4$, $LiAsF_6$, LiBOB, LiFSI or LiI.

19. Ionically conducting material according to claim 17, further comprising a plasticizer chosen from liquid aprotic polar solvents.

20. Electrochemical device comprising an electrolyte between two electrodes, wherein the electrolyte is an ionically conducting material according to claim 17.

21. Selective membrane comprising a film of a copolymer according to claim 1, in which the O/Li ratio is between 10 and 30.

22. Reference membrane for a membrane sensor, comprising a film of a copolymer according to claim 1 in which the O/Li ratio is between 10 and 30.

23. Ionically conducting material according to claim 17, further comprising $NC-CH_2-CH_2)_2NCO-CF(CF_3)-SO_3Li$ or $(CH_3O-CH_2-CH_2)_2NCO-CF(CF_3)-SO_3Li$.

24. Ionically conducting material consisting essentially of a crosslinked material according to claim 8.

25. Ionically conducting material according to claim 24, further comprising a lithium salt selected from the group consisting of $(CF_3SO_2)_2NLi$ (LiTFSI), $(CF_3SO_2)_2CHLi$ (LiTFSM), $(CF_3SO_2)_3CLi$ (LiTTFSM), $CF_3SO_3Li$ (TFLi), $LiClO_4$, $LiPF_6$, $LiBF_4$, $LiAsF_6$, LiBOB, LiFSI or LiI.

26. Ionically conducting material according to claim 24, further comprising a plasticizer chosen from liquid aprotic polar solvents.

27. Electrochemical device comprising an electrolyte between two electrodes, wherein the electrolyte is an ionically conducting material according to claim 24.

28. Method according to claim 5, wherein the reactants are used in substoichiometric amount, for the conversion of the $-CH_2OH$ groups into $-CH_2-O-SO_3Li$ groups, so as to obtain a copolymer comprising U(OH) units.

* * * * *